(12) United States Patent
Matsuya

(10) Patent No.: US 8,441,683 B2
(45) Date of Patent: May 14, 2013

(54) IMAGE PROCESSING APPARATUS, IMAGE PROCESSING METHOD, AND RECORDING MEDIUM FOR CORRECTING THE DENSITY AT AN EDGE OF AN IMAGE TO BE PRINTED

(75) Inventor: Akihiro Matsuya, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 976 days.

(21) Appl. No.: 12/354,035

(22) Filed: Jan. 15, 2009

(65) Prior Publication Data

US 2009/0185227 A1 Jul. 23, 2009

(30) Foreign Application Priority Data

Jan. 18, 2008 (JP) .................... 2008-009541

(51) Int. Cl.
*H04N 1/40* (2006.01)

(52) U.S. Cl.
USPC ........... 358/2.1; 358/1.9; 358/3.14; 358/3.15; 358/3.27; 358/504; 358/518; 358/537; 358/538

(58) Field of Classification Search .................... 358/504
See application file for complete search history.

(56) References Cited

U.S. PATENT DOCUMENTS

| | | | | |
|---|---|---|---|---|
| 5,995,248 A * | 11/1999 | Katori et al. | .................... | 358/2.1 |
| 6,233,062 B1 * | 5/2001 | Takamatsu et al. | ........... | 358/463 |
| 6,304,278 B1 * | 10/2001 | Coleman | ........................ | 347/110 |
| 6,449,060 B1 | 9/2002 | Kawai et al. | .................... | 358/1.9 |
| 7,085,009 B2 | 8/2006 | Kawai et al. | .................... | 358/1.9 |
| 7,142,329 B2 | 11/2006 | Kawai et al. | .................... | 358/2.1 |
| 7,148,997 B2 | 12/2006 | Kawai et al. | .................... | 358/1.9 |
| 7,327,871 B2 * | 2/2008 | Ishikawa | ........................ | 382/145 |
| 7,339,701 B2 * | 3/2008 | McElvain | ........................ | 358/1.9 |
| 7,548,344 B2 * | 6/2009 | Matsuya | ........................ | 358/1.9 |
| 7,606,438 B2 * | 10/2009 | Sugimoto | ..................... | 382/266 |
| 7,634,208 B2 * | 12/2009 | Sugiyama | ........................ | 399/68 |
| 7,930,654 B2 * | 4/2011 | Kramer et al. | ................... | 716/51 |
| 7,948,666 B2 * | 5/2011 | Yoshida et al. | ............... | 358/518 |
| 8,033,630 B2 * | 10/2011 | Miyamoto et al. | .............. | 347/15 |

(Continued)

FOREIGN PATENT DOCUMENTS

| | | |
|---|---|---|
| JP | 09-085993 | 3/1997 |
| JP | 10-65920 A | 3/1998 |
| JP | 10065920 A * | 3/1998 |
| JP | 2004-021201 | 1/2004 |

OTHER PUBLICATIONS

Japanese Office Action dated Nov. 11, 2011, in counterpart Japanese Application No. 2008-009541.

*Primary Examiner* — Dung Tran
(74) *Attorney, Agent, or Firm* — Fitzpatrick, Cella, Harper & Scinto

(57) ABSTRACT

An image processing apparatus and image processing method perform adaptive correction at edges of an image to be printed in accordance with the conditions of output equipment outputting an image to be printed. The image processing apparatus includes: a printed sample generating component for generating a printed sample having a plurality of gray scale regions for correcting gray scale at edges of the image to be printed; a gray scale region selecting component for selecting from the printed sample generated by the printed sample generating component a gray scale region for realizing visually uniform gray scale at the edges; and an edge image correcting component for correcting edge regions of the image to be printed in accordance with a gray level of the gray scale region selected by the gray scale region selecting component.

6 Claims, 26 Drawing Sheets

U.S. PATENT DOCUMENTS

| | | | |
|---|---|---|---|
| 2003/0206308 A1* | 11/2003 | Matsuya | 358/1.9 |
| 2004/0114162 A1* | 6/2004 | McElvain | 358/1.9 |
| 2004/0264760 A1* | 12/2004 | Ishikawa | 382/145 |
| 2006/0251439 A1* | 11/2006 | Sugiyama | 399/68 |

* cited by examiner

| index (i) | GAIN | MAXIMUM GRAY LEVEL |
|---|---|---|
| 0 | 1.00 | 102 |
| 1 | 1.01 | 103 |
| 2 | 1.02 | 104 |
| 3 | 1.04 | 106 |
| 4 | 1.05 | 107 |
| 5 | 1.06 | 108 |
| 6 | 1.07 | 109 |
| 7 | 1.09 | 111 |
| 8 | 1.10 | 112 |
| 9 | 1.11 | 113 |
| 10 | 1.12 | 114 |
| 11 | 1.13 | 115 |
| 12 | 1.15 | 117 |
| 13 | 1.16 | 118 |
| 14 | 1.17 | 119 |
| 15 | 1.18 | 120 |

FIG.9

| Bit STRING | | | | ATTRIBUTE INFORMATION |
|---|---|---|---|---|
| 0 | 0 | 0 | 0 | IMAGE |
| 0 | 0 | 0 | 1 | – |
| 0 | 0 | 1 | 0 | TEXT |
| 0 | 0 | 1 | 1 | – |
| 0 | 1 | 0 | 0 | GRAPHICS |
| 0 | 1 | 0 | 1 | – |
| 0 | 1 | 1 | 0 | – |
| 0 | 1 | 1 | 1 | – |
| 1 | 0 | 0 | 0 | LINE |
| 1 | 0 | 0 | 1 | – |
| 1 | 0 | 1 | 0 | – |
| 1 | 0 | 1 | 1 | – |
| 1 | 1 | 0 | 0 | – |
| 1 | 1 | 0 | 1 | – |
| 1 | 1 | 1 | 0 | – |
| 1 | 1 | 1 | 1 | – |

FIG.11

| (2,2) |
|---|
| (1,2) |
| (0,2) |
| (1,2) |
| (2,2) |

FIG.14

| (2,2) |
|---|
| (1,2) |
| (1,2) |
| (2,2) |

FIG.15

| (1,1) |
|---|
| (0,1) |
| (1,1) |

FIG.16

| (1,1) |
|---|
| (1,1) |

FIG.17

| GRAY LEVEL | LOWER SIDE |
|---|---|
| $0\% \leq v < 20\%$ | 1.00 |
| $20\% \leq v < 30\%$ | 1.02 |
| $30\% \leq v < 40\%$ | 1.02 |
| $40\% \leq v < 50\%$ | 1.03 |
| $50\% \leq v < 60\%$ | 1.08 |
| $60\% \leq v < 70\%$ | 1.07 |
| $70\% \leq v \leq 100\%$ | 1.03 |

FIG.20

IMAGE PROCESSING APPARATUS, IMAGE PROCESSING METHOD, AND RECORDING MEDIUM FOR CORRECTING THE DENSITY AT AN EDGE OF AN IMAGE TO BE PRINTED

BACKGROUND OF THE INVENTION

1. Field of the Invention

The present invention relates to an image processing method for printing on printing media, and more particularly to a technique of improving image deterioration at edges of an image printed.

2. Description of Related Art

Conventionally, an image forming apparatus using electrophotography, such as a laser beam printer, forms an electrostatic latent image by charging a photoconductive body followed by exposing, develops the latent image with toner working as a developer, and then forms an image on a recording medium using a well-known electrophotographic process. In such an image forming apparatus, a phenomenon sometimes occurs that gray level becomes thick or thin at edges of the image printed on the recording medium.

FIG. 1 is a schematic expression of the phenomenon. The figure shows a rectangular patch uniformly printed at a prescribed gray level, the horizontal direction of which is a main scanning direction and the vertical direction is a subscanning direction. In addition, regions (a) and (b) in this figure represent image edges in the subscanning direction.

The example of FIG. 1 shows that the rectangular patch that must be printed in a uniform gray level originally is printed thicker than the prescribed gray level in the region (a) and thinner than the prescribed gray level in the region (b) in accordance with the electrophotographic characteristics of the image forming apparatus. The degree of the gray level variation demonstrated by (a) and (b) changes according to the environment in which the image forming apparatus is used or its durability. In addition, it is known that directional characteristics of printing demonstrated by (a) and (b), that is, thicker in (a) and thinner in (b), differ depending on the configuration of a developing machine in general.

As for causes of the gray level variation on the image edges, there are various types of causes such as those depending on the image formation or the developing process, or those depending on the transfer or the fixing process. The phenomenon is generally referred to as "sweep-up" or "solid black with white microdots" (see Japanese Patent Laid-Open No. 2004-21201, for example).

Generally, the phenomenon as shown in FIG. 1 is apt to be perceived as image deterioration in an image having a uniform signal level and a lot of high frequency components, which is represented by a rectangular line drawing and characters, which are printed and output in PDL (Page Description Language). In contrast, it is also known that the phenomenon has a characteristic of being hardly perceived as conspicuous image deterioration in natural images such as photographs.

In view of such a problem of the output image, as a technique of improving the image deterioration at the image edges, Japanese Patent Laid-Open No. H09-085993 (1997) is proposed. An example of Japanese Patent Laid-Open No. H09-085993 (1997) detects edges/non-edges of an image from video data being processed, and modifies a toner image affecting the edges by multiplying a non-edge signal by a prescribed value, thereby improving the image deterioration. Another embodiment makes a decision as to attribute information on an image such as a line image independently of the edges/non-edges, and improves the image deterioration by varying the gray level signal in accordance with the line width.

In the technique of Japanese Patent Laid-Open No. H09-085993 (1997) that corrects the gray level variation at the image edges described in the foregoing related art, it describes its effect in that it adjusts the halftone characteristic, the amount of laser light and the correction width by checking the deterioration conditions of the target image forming apparatus. In particular, it obtains its effect in the sharpness or scatting conditions in the text region, and the consumption of the toner.

However, the foregoing method is a correction technique paying attention to the forming process that is apt to thicken the edges, but does not provide a correction technique for the forming process that will make the edges thin.

In an image forming apparatus using the electrophotographic process and the like, the image forming characteristics at the image edges cannot necessarily be improved in regular correction conditions because of the use environment, durability and individual differences found in the apparatus. Accordingly, an adaptive correction method is desirable for the image edges, which fits the conditions of output equipment. From such a viewpoint, the foregoing method does not provide the adaptive correction method fitting the conditions of the equipment.

SUMMARY OF THE INVENTION

An object of the present invention is to correct the gray scale in the image edges after grasping the current deterioration conditions in the image having different directional characteristics of printing in the vertical direction, when correcting the gray scale in the image edges as described above in the Related Art.

The present invention generates data for grasping edge deterioration conditions of the image forming apparatus to be used, and detects the degree of the gray level deterioration at edges from the output. It solves the foregoing problem by adaptively correcting an image to be printed from a result of the detected gray level in accordance with the directional characteristics of printing at the edges, and specifically has the following configuration.

The image processing apparatus in accordance with the present invention is characterized by including: a printed sample generating component configured to generate a printed sample having a plurality of gray scale regions for correcting gray scale at edges of an image to be printed; a gray scale region selecting component configured to select from the printed sample generated by the printed sample generating component a gray scale region for realizing visually uniform gray scale at the edges; and an edge image correcting component configured to correct edge regions of the image to be printed in accordance with a gray level of the gray scale region selected by the gray scale region selecting component.

In addition, the image processing apparatus in accordance with the present invention is characterized by including: a printed sample generating component configured to generate a printed sample having a plurality of gray scale regions for correcting gray scale at edges of an image to be printed; a gray scale region detecting component configured to read out the printed sample generated by the printed sample generating component with a reading device, and to detect in the printed sample read out a gray scale region for realizing uniform gray scale at the edges of the image; and an edge image correcting component configured to correct edge regions of the image to be printed in accordance with a gray level of the gray scale region at edges of the printed sample detected by the gray scale region detecting component.

Furthermore, the image processing apparatus in accordance with the present invention is characterized by including: a printed sample generating step of generating a printed sample having a plurality of gray scale regions for correcting gray scale at edges of an image to be printed; a gray scale region selecting step of selecting from the printed sample generated at the printed sample generating step a gray scale region for realizing visually uniform gray scale at the edges; and an edge image correcting step of correcting edge regions of the image to be printed in accordance with a gray level of the gray scale region selected at the gray scale region selecting step.

Moreover, the image processing apparatus in accordance with the present invention is characterized by including: a printed sample generating step of generating a printed sample having a plurality of gray scale regions for correcting gray scale at edges of an image to be printed; a gray scale region detecting step of reading out the printed sample generated at the printed sample generating step with a reading device, and of detecting in the printed sample read out a gray scale region for realizing uniform gray scale at the edges of the image; and an edge image correcting step of correcting edge regions of the image to be printed in accordance with a gray level of the gray scale region at edges of the printed sample detected at the gray scale region detecting step.

The various steps in each image processing method can be configured as a program for causing a computer in a various types of image processing apparatuses or information processing apparatuses to execute the steps. Thus, the computer can carry out the image processing method by reading the program. In addition, as for the program, the computer can read it out of a computer readable storage medium that stores it.

According to the present invention, in correcting the gray scale at the edges of the image as described in Related Art, it can correct the gray scale at the image edges after grasping the current deterioration conditions for the image with directional characteristics of printing varying in the vertical direction.

Further features of the present invention will become apparent from the following description of exemplary embodiments (with reference to the attached drawings).

BRIEF DESCRIPTION OF THE DRAWINGS

FIG. 9 is a table showing relationships between the correction gain and the maximum gray level at the lower side of the 40% patch in the embodiments 1 and 2 in accordance with the present invention;

FIG. 11 shows an example of attribute information supposed in the present invention;

FIG. 14 shows an example of the exceptional processing of the correction position determination in the embodiments 1 and 2 in accordance with the present invention;

FIG. 15 shows an example of the exceptional processing of the correction position determination in the embodiments 1 and 2 in accordance with the present invention;

FIG. 16 shows an example of the exceptional processing of the correction position determination in the embodiments 1 and 2 in accordance with the present invention;

FIG. 17 shows an example of the exceptional processing of the correction position determination in the embodiments 1 and 2 in accordance with the present invention;

FIG. 20 shows an example of the real correction gains which will be explained in the embodiments 1 and 2 in accordance with the present invention;

DESCRIPTION OF THE EMBODIMENTS

The preferred embodiments in accordance with the present invention will now be described with reference to the accompanying drawings. The components described in the embodiments are only examples, and the scope of the present invention is not limited to these components.

[Overview]

In the embodiment 1 described below, a plurality of patches used for gray scale correction at image edges are created for individual gray scale regions having a predesignated gray level. Then, visually appropriate gray levels in the state of the printed patches is designated by a user, and then the gray scale correction at the image edges is performed in accordance with the designated gray levels. On the other hand, in the embodiment 2, patches are read using a reading device, and gray levels for carrying out automatic appropriate correction are analyzed so that the gray scale correction at the image edges is performed in accordance with the analyzed gray levels.

Incidentally, although the embodiments are described by way of example of a multifunction peripheral (MFP) using the electrophotography technique, the present invention is not limited to it.

Embodiment 1

[Description of Overall Configuration of MFP]

Figure 2:
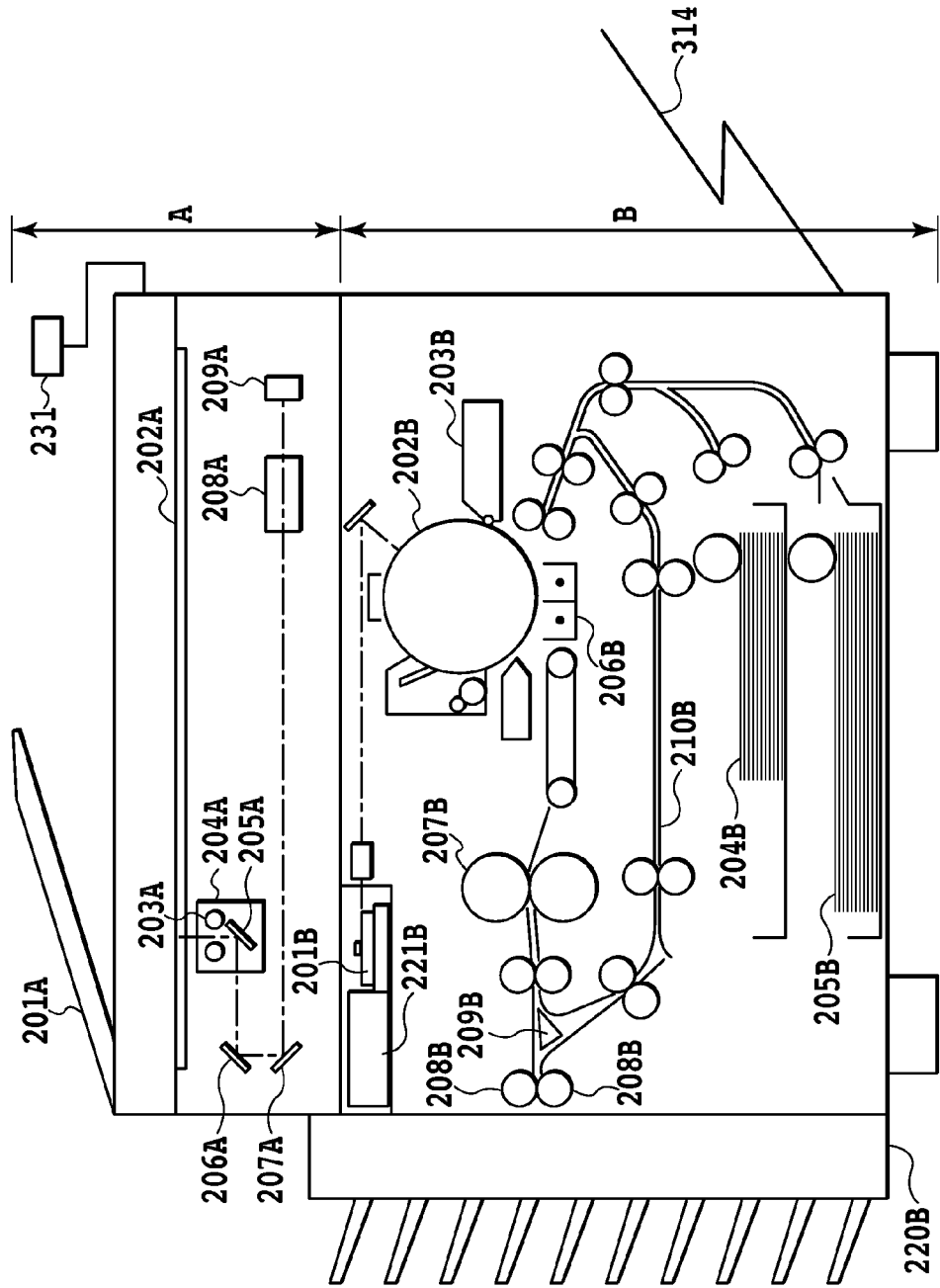
FIG. 2 is a schematic diagram showing an image processing apparatus in accordance with the present invention.

FIG. 2 is a schematic cross-sectional view showing a mechanical construction of the MFP of the present embodiment. The MFP has a color scanner unit A and a printer unit B.

In the following, the color scanner unit A will be described first, and then the printer unit B will be described.

An original document feeding unit 201A feeds original documents one by one successively from the final page onto a platen glass 202A. Then, the original document on the platen glass 202A is ejected after being read. When the original document is conveyed onto the platen glass 202A by the original document feeding unit 201A, an indicator 203A is turned on, and a scanner unit 204A loaded with the indicator 203A is moved to carry out exposure scanning of the original document. The reflected light from the original document by the exposure scanning is led to a CCD color image sensor (simply called "CCD" from now on) 209A via mirrors 205A, 206A and 207A and lenses 208A. Then, the reflected light incident on the CCD 209A is converted to luminance signals for respective colors obtained by dispersing it into three colors R, G and B. In addition, the luminance signals output from the CCD 209A are converted into digital image data through A/D conversion, and are input to an image processing unit 304 (see FIG. 3). After undergoing well-known image processing, such as shading correction, gray scale correction and binarization, the luminance signals are output to the printer unit B (305) to be printed.

In the printer unit B, a laser driver 221B, which drives a laser unit 201B, causes the laser unit 201B to output laser light corresponding to the image data of respective colors output from the image processing unit 304. The laser light output in this manner is applied to a photoconductive drum 202B so that an electrostatic latent image is formed on the surface of the drum 202B in accordance with the laser light. Then the toner, or developer, is attached to the latent image portion on the photoconductive drum 202B by the developing unit 203B. Incidentally, although FIG. 2 shows only one developing unit for the sake of simplifying the drawing, it goes without saying that toners are prepared for the colors C, M, Y and K, respectively, and that four developing units are installed accordingly. Alternatively, instead of the foregoing construction, such a construction is also possible which has four sets of a photoconductive drum, developing unit and the like for the four colors.

At the timing in synchronization with the start of the irradiation with the laser light, a recording sheet is fed from one of cassette 204B and cassette 205B, which is selected, and the recording sheet is conveyed to a transfer unit 206B. In this way, the developer attached to the photoconductive drum 202B can be transferred to the recording sheet. The recording sheet having the developer transferred thereonto is conveyed to a fixing unit 207B so that the developer is fixed onto the recording sheet by means of the heat and pressure of the fixing unit 207B. Then, the recording sheet passing through the fixing unit 207B is ejected through output rollers 208B. A sorter 220B sorts the recording sheets by putting the recording sheets ejected in prescribed bins. When the sorting is not designated, the sorter 220B puts the recording sheets having passed through the recording only in the uppermost bin.

When double-sided printing is set, after having been conveyed to the output rollers 208B, the recording sheet is introduced into the paper conveying path again with a flapper 209B by reversing the output rollers 208B. The recording sheet led to the paper conveying path again in this manner is fed to the transfer unit 206B at the timing described above. As for the processing of the latent image and developing of the individual colors and fixing of them, it is well known that they are carried out by repeating the latent image forming and the like four times using the conveying system of the recording sheet.

The reference numeral 314 designates a network generally connected to the network called Ethernet (registered trademark). This enables the individual units interconnected to exchange information or to transfer data between them using physical cables such as 10 Base T and 10 Base 5 according to a protocol like TCP/IP. It goes without saying that the communication is not limited to the wire system using network cables, but a similar environment can be constructed using the wireless system. Thus, the printer unit B can receive PDL data or bitmapped image data from a PC connected to the network, and print them.

[Outline of Electrical Configuration of Entire System and its Operation]

Figure 3:
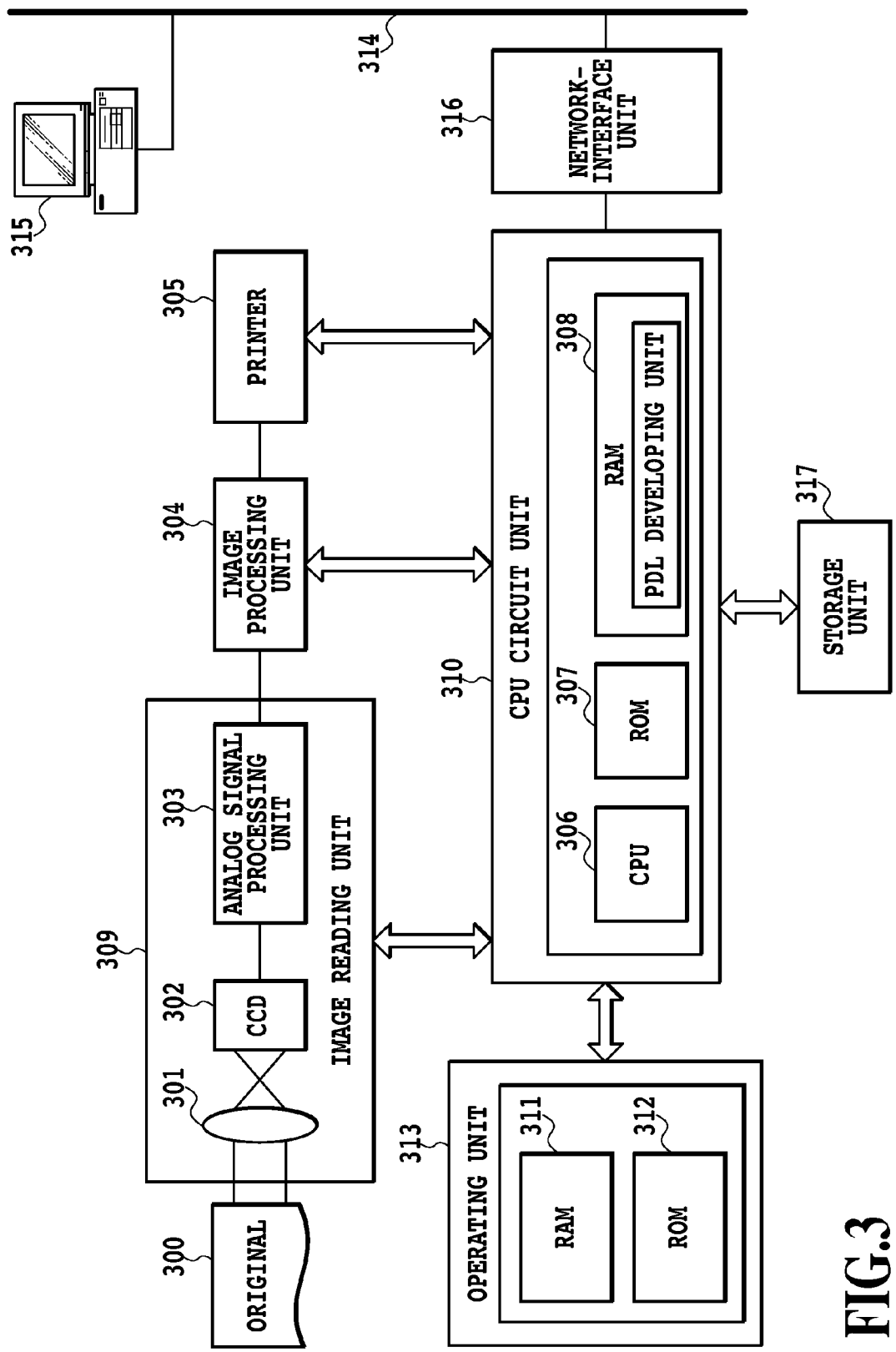
FIG. 3 is a block diagram showing an electrical configuration of the image processing apparatus in accordance with the present invention.

FIG. 3 is a block diagram for describing an outline of the electrical processing of the MFP of the present embodiment. The system configuration will be described referring to FIG. 3 and using FIG. 4 as needed together with the explanation of the processing of the image processing unit 304.

An image reading unit 309, which includes a lens 301, a CCD sensor 302 and an analog signal processing unit 303, converts the image signal of an original document image 300 formed on the CCD sensor 302 via the lens 301 to an analog electric signal with the CCD sensor 302. The electric signal is input to the analog signal processing unit 303 to undergo sample and hold and dark level correction, followed by analog-to-digital conversion (A/D conversion).

The digital signal passing through the conversion undergoes shading correction processing 403, subscanning offset correction processing 404, and input color space converting processing 405 in an image processing unit 304 constituting a featuring portion of the present embodiment. The subscanning offset correction processing 404 is processing for correcting the phase in the subscanning direction or a slight phase shift due to optical characteristics, which becomes necessary because the RGB channels are each configured as a line sensor in the case of a color scanner. The input color space converting processing 405 is processing for converting the input RGB signals to another RGB space facilitating the image processing. The input color space converting processing 405 can be achieved by a well-known matrix operation, or by conversion using a prescribed three-dimensional LUT (look-up table).

Subsequently, input filtering processing 406 is performed for correcting an MTF (Modulation Transfer Function) which suffers deterioration due to optical characteristics such as those of the CCD and lenses. In addition, resolution converting processing 407 is performed for scaling in accordance with the designated magnification in response to the instruction of an operating unit 313, or for transmitting to a FAX not shown or to a PC 315 via the network 314. If necessary, it carries out compressing processing 408 for storing into a memory (RAM) 308 or a hard disk (storage unit) 317, and executes the scanner-side processing which is designated by the reference numeral 401 in FIG. 4.

When the scanner-side image processing 401 has been completed, the processed data is temporarily stored in a storage unit 317, and then delivered to a printer-side image processing 402.

In the printer-side image processing 402, decompressing processing 409 decompresses the compressed image to the original raster image, first.

Subsequently, groundwork skipping processing 410 skips a groundwork portion of the original document image as needed, an LUT 411 converts the input RGB luminance signals to gray level signals, and output color space converting processing 412 generates CMYK signals.

The output color conversion processing 412 can generate the CMYK signals by performing the well-known matrix operation or by using a prescribed three-dimensional LUT as in the input color space conversion processing. After that, in edge gray scale correction processing 414 which will be described later and γ processing 415 for correcting the gray scale characteristics of a printer engine, gray scale characteristics are corrected. Then, in halftone processing 416, screen processing and/or error diffusion processing are performed to express the image by area gradation. After that, well-known smoothing processing 417 is performed to deliver the image to a printer 305.

Figure 4:
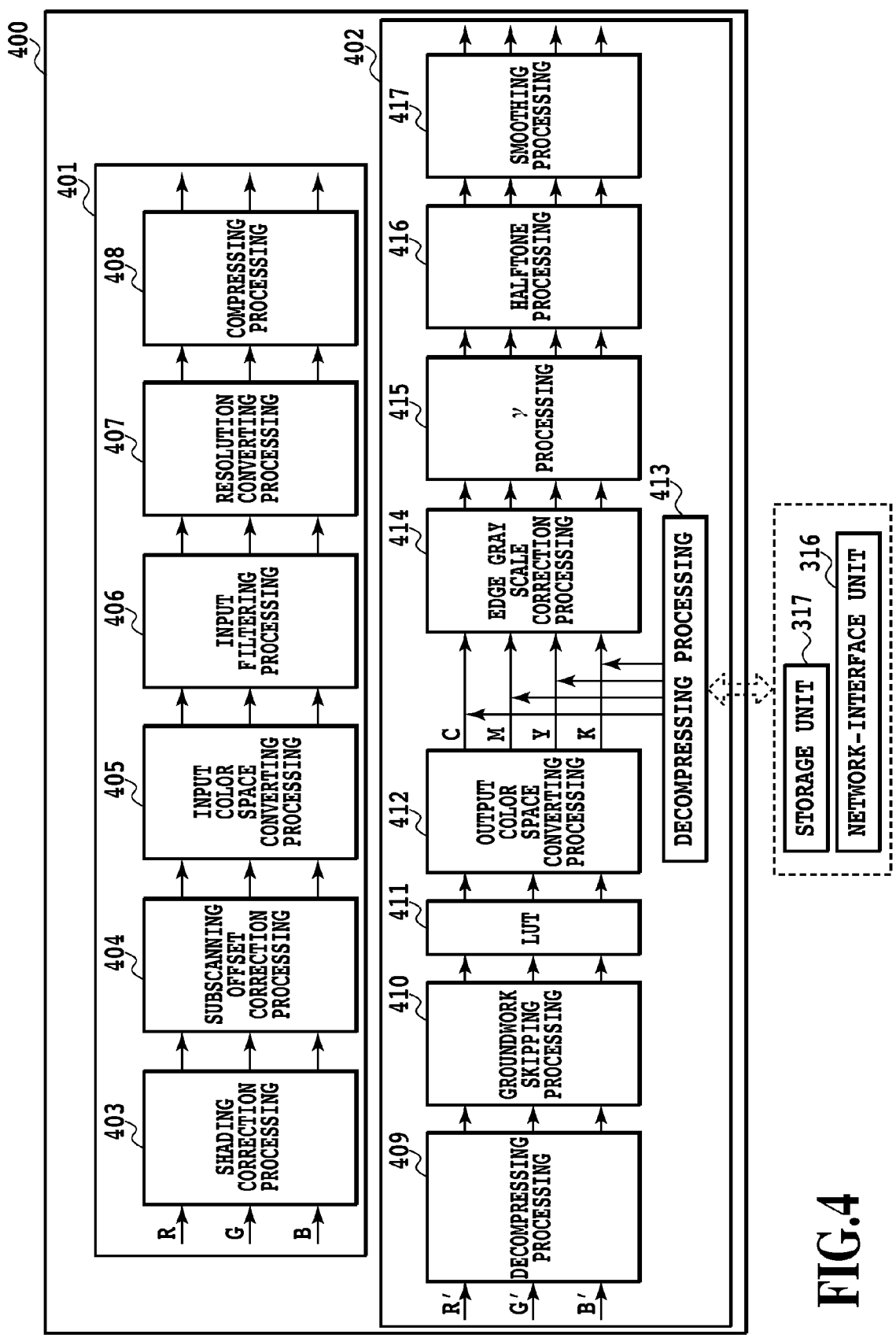
FIG. 4 is a block diagram of the image processing in accordance with the present invention.

Although not shown in FIG. 4, the scanner-side image processing 401 can include image region separating processing for recognizing a characteristic region of the image in which the input RGB signals have high frequency components such as characters and thin lines, or for recognizing as to whether pixels of interest have a brilliant chromatic color or not. Using the processing result, the printer-side image processing 402 can also perform adaptive processing.

The image processing unit 304 is supplied not only with the digital signal from the analog signal processing unit 303, but also with the image signal transmitted via the network 314. The image signal includes PDL data based on PS (PostScript) or LIPS transmitted from the PC 315. It goes without saying that these data may be transmitted in a compressed version, in which case the decompressing processing 413 in the image processing unit 304 decompresses them.

As for these decompressed image signals, the processing of the image processing unit 304, which can be applied on the signal of the image reading unit 309, is also applicable to them without change. Thus, the color correction processing, smoothing processing, edge emphasis, halftone processing, γ correction and the like can be performed in addition to the foregoing compressing/decompressing processing. It is also possible to adaptively switch the processing in accordance with the object (text, graphics or image) analyzed from the PDL data, and the image signals after the processing are output to the printer 305. The printer 305 is the same as the printer unit B described with reference to FIG. 2.

Next, a CPU circuit unit 310 will be described.

The CPU circuit unit 310 has a CPU 306, a ROM 307, a RAM 308, and a network-interface unit 316 as shown in FIG. 3. The CPU 306 is a control unit for controlling the apparatus in its entirety. The ROM 307 is a nonvolatile memory for storing programs and data executed and used by the CPU 306, and the RAM 308 is a volatile memory including a work area used during the control operation of the CPU 306. The network-interface unit 316 is an input/output control device for controlling the interface with the network 314. The CPU circuit unit 310 with such a configuration controls the image reading unit 309, the image processing unit 304, the printer 305 and the operating unit 313, and integrally controls the operation sequence of the MFP of the present embodiment. As for the control (processing) shown in individual processing flows which will be described later, the CPU circuit unit 310 executes it in accordance with software loaded in advance in the work area of the RAM 308 in the CPU circuit unit 310, except for the operation by the operator.

The operating unit 313, which has a RAM 311 and a ROM 312, is capable of displaying a UI screen on the screen of the operating unit 313, and storing information the user sets. The information the user sets through the operating unit 313 is delivered to the image reading unit 309, the image processing unit 304 and the printer 305 via the CPU circuit unit 310.

The point of the present invention in the flow of the image signal described above is to utilize edge gray scale correction processing 414 (edge image correction unit) included in the image processing unit 304, and to utilize the CPU circuit unit 310 to make effective use of the processing unit.

The processing unit for correcting the image edges, which is described in the present embodiment, is roughly divided into two parts: a correction value generating unit for identifying a portion to be corrected and for generating its correction values; and an edge gray scale correction unit for applying the correction values to the image edges.

[Description of Correction Value Generating Unit]

Next, the correction value generating unit for generating the correction values (correction gray levels) of the portions to be corrected will be described with reference to FIG. 5.

[Generation of Edge Correction Values]

Figure 1:
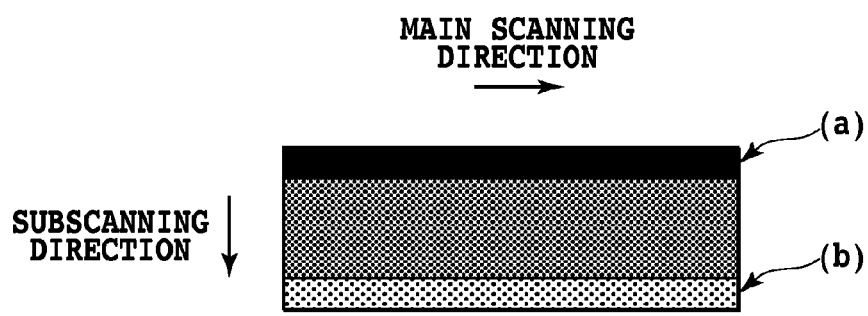
FIG. 1 is a view showing a gray level variation at patch edges, which constitutes the assumption of the present invention.

In an object such as a rectangular object as shown in FIG. 1, which has to have a uniform gray level characteristic and sharp edges, the gray level variations in the edges are apt to be conspicuous. In the case of performing edge correction of such an image object, the degree of deterioration also varies depending on the printer characteristics.

Before describing the following processing steps, the entire structure of patches (printed samples) for observing the edge characteristics at the image edges, which will be used in the present embodiment, will be described with reference to FIG. 6.

Figure 6:
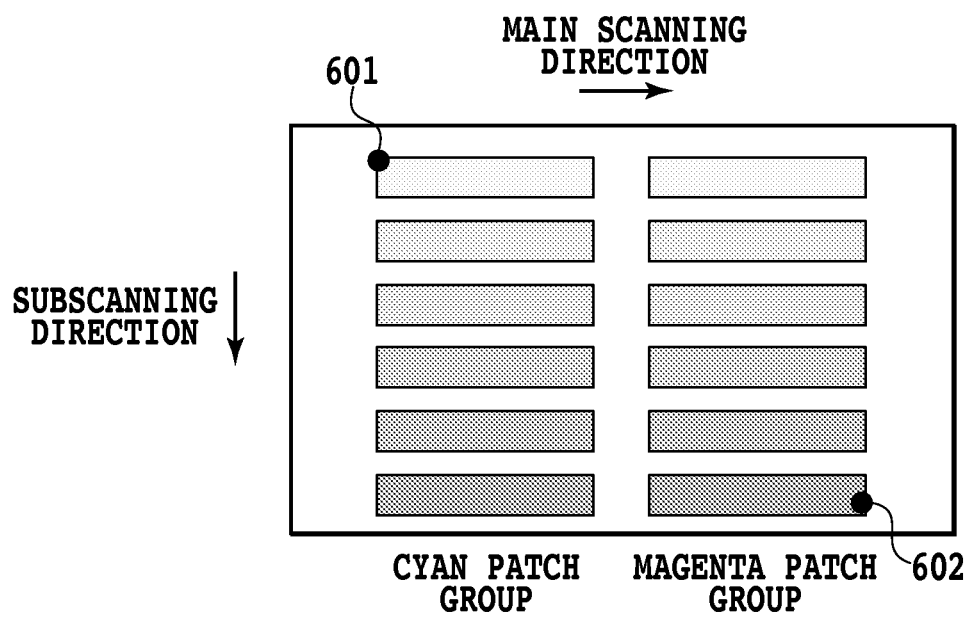
FIG. 6 shows an example of a chart for correction level measurement in accordance with the present invention.

FIG. 6 shows a set of patches with six types of uniform gray level signals, which is called a "cyan patch group" and arranged on the left side of a sheet of paper; and a set of patches, which is called a "magenta patch group" arranged on its right side. As for the six types of patches, six types of patch images (whose gray levels are 20%, 30%, 40%, 50%, 60% and 70%, for example) are generated for respective predesignated gray scale regions.

Since only two colors are created on a sheet of paper in the present embodiment, another sheet of paper is necessary to perform the same for other colors (such as yellow and black) and to form and output similar images. Although the present invention limits the gray scale regions to be corrected to six types, the number of types is not limited to six.

At step S501, using the operating unit 313, a user designates colors (cyan, magenta, yellow and black) to be corrected and a type of screen (image forming pattern) used in halftone, first. The designated colors and screen type are temporarily stored in the RAM 308 of the CPU circuit unit 310.

At step S502, to generate the patch data for edge correction described with reference to FIG. 6, the correction gain (the details of which will be described later) is input for generating a gray level of interest.

Figure 7:
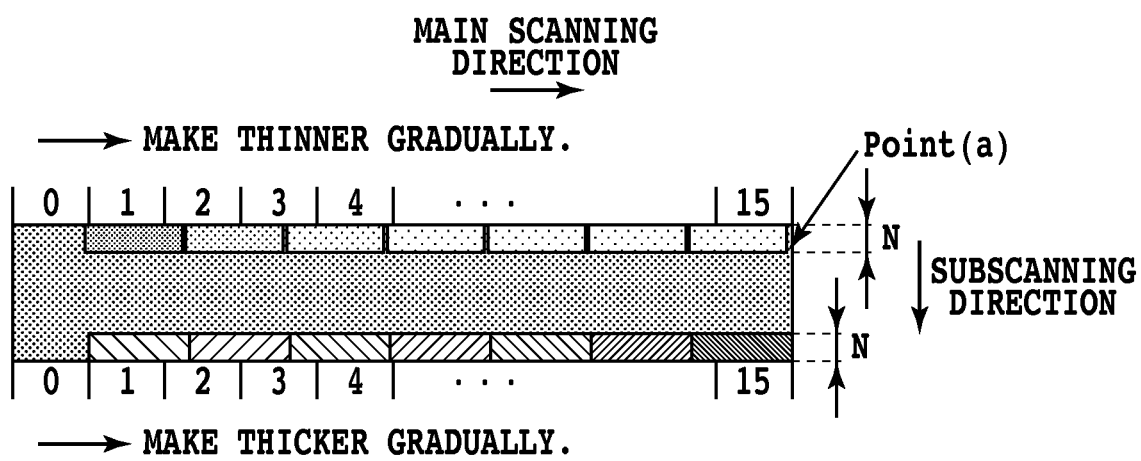
FIG. 7 shows an example of creating a patch in the chart explained in FIG. 6.

FIG. 7 illustrates conditions of one of the patches shown in FIG. 6. The patch shown in FIG. 7 has a scale (index) of 16 grades from 0 to 15 from left to right. FIG. 7 shows that the width of the patch in the main scanning direction is divided into 16 grades, and that each of the 16 grades at the upper and lower ends of the patch has, for the gray level of interest, a gray level (correction value) that alters its degree of correction. The operator can use the scale (index) to select a region whose gray level is visually uniform (step S506 which will be described later).

Although the present embodiment performs the edge gray scale correction processing 414 described in FIG. 4 before the halftone processing 416, it can carry out the edge gray scale correction processing 414 after the halftone processing 416. In this case, the 16 grades described in FIG. 7 depend on the bit accuracy after the halftone processing, and the degree of freedom of setting the correction value is limited. Incidentally, although the present embodiment limits the correction grades to 16 levels, it can have a greater number of correction grades when carrying out the edge gray scale correction processing 414 before the halftone processing 416 as shown in the present embodiment.

The present invention supposes that the directional characteristics of printing are confirmed at the edges as shown in FIG. 1 (the upper side is output thickly and the lower side is output thinly). Thus, the 16 grades are configured in such a manner that they are gradually made thin in the main scanning direction with respect to the original gray level on the upper side, and are made gradually thick on the lower side. In either case, it should be noted that index 0 has the original gray level of the patch.

As for the correction gain designated at step S502, it designates the maximum correction gain among the correction gains applied to obtain the 16-grade correction values. The present embodiment can set independent upper and lower side maximum correction gains (that is, lower side correction gain and upper side correction gain) for each patch gray level designated (6 steps in FIG. 6). The following Formula (1) is a formula for obtaining the correction value of each index of the patch gray level of interest on the lower side, and Formula (2) is a formula for obtaining the correction value of each index of the patch gray level of interest on the upper side.

Gray level of lower side index($i$)=Gray level of patch of interest×{1+($i$/15)×lower side correction gain of patch of interest} (1)

where $i$ denotes an index and takes an integer value from 0 to 15.

Gray level of upper side index($i$)=Gray level of patch of interest×{1−($i$/15)×upper side correction gain of patch of interest} (2)

where $i$ denotes an index and takes an integer value from 0 to 15.

For example, consider the patch with the gray level 40%. In this case, if the user designates through the operating unit 313 that the upper side correction gain of the patch is 0.8, and the lower side correction gain is 0.18, the upper side index 0 takes a value 102, which is equal to the signal of interest of 40%, where the dynamic range of the gray level signal is assumed to be 8 bits (=255). On the other hand, the lower side index 1 takes a value 103 (rounding), and the lower side index 15 takes a value 120. In Formula (1) and Formula (2), if the calculation result exceeds the dynamic range, the value whose exceeding portion is clipped is used.

FIG. 9 shows, as to the indices on the lower side of the 40% patch of interest in the present embodiment, relationships between the correction gains and the maximum gray levels. In the table of FIG. 9, the leftmost column shows the index values of the lower side of the 40% patch; the rightmost column shows the maximum gray levels (which will be described later); and the center column shows the correction gains obtained by calculation. In the table of FIG. 9, according to Formula (1), the correction gain of each index is calculated from the lower side correction gain designated through the operating unit 313. Here, the term "the correction gains of the indices on the lower side" corresponds to "1+($i$/15)×lower side correction gain of patch of interest" in Formula (1). When the maximum gray level of the indices is known, the correction gains ($i$) of the lower side indices are obtained by the following Formula (3). For example, the correction gain (1) of the lower side index (1) is obtained by substituting $i$=1 into Formula (3).

Correction gain($i$)=Maximum gray level of index($i$)/Maximum gray level of index(0) (3)

Accordingly, the correction gain (1) is obtained by 103/102=approximately 1.01 (significant to two decimal places). The calculated values are obtained according to Formula (1) and Formula (2) or Formula (3) by the software loaded on the work area on the RAM 308 in the CPU circuit unit 310 in advance. The calculation results are temporarily stored in a prescribed area on the RAM 308. It goes without saying that the correction gains of the individual upper side indices ($i$) can be obtained in the same manner.

Although the present embodiment generates the patch data for the indices by dividing the patch equally in the main scanning direction according to the maximum correction gain designated, it can generate the patch data by dividing the patch nonlinearly.

At step S503, patches for the edge gray scale correction are generated (printed sample generating unit) from the maximum correction gains designated independently for the upper and lower sides for respective gray scale regions separately at step S502.

[Generation of Patches for Edge Gray Scale Correction]

Figure 5:
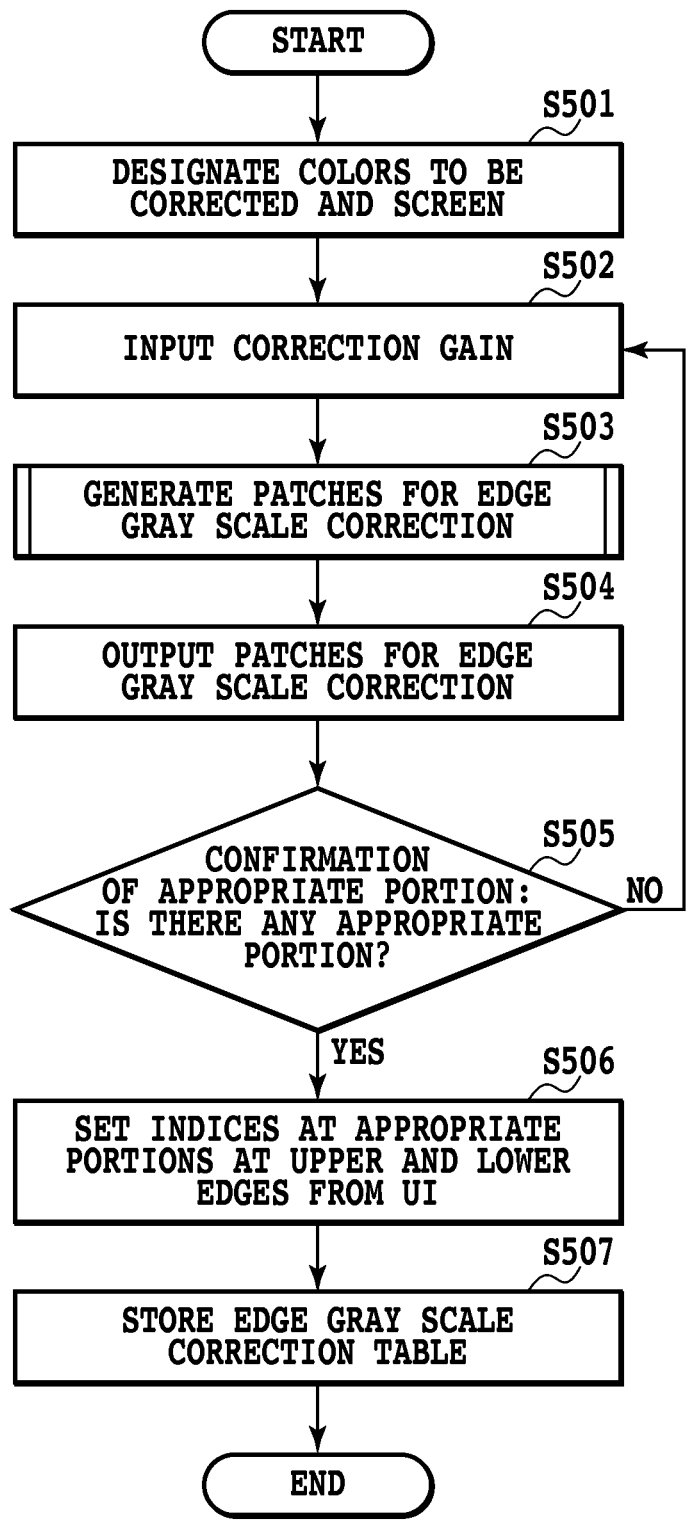
FIG. 5 is a flowchart of correction value generation in an embodiment 1 in accordance with the present invention.

At step S801, using Formulas (1) and (2) described at step S502 of FIG. 5, the CPU circuit unit 310 obtains the maximum gray level in each index ($i$) for the six types of patches of the same color to be output. As for the term "maximum gray level" mentioned here, the patches generated in each index ($i$) are gradually varying from the original gray level to the correction value obtained by Formula (1) or (2) from the inside to the end in the subscanning direction. That is, the correction value is a maximum gray level in varying of the gray level, so it is used only formally as the term "maximum gray level".

Thus, except for the index (0) with the gray level of the patch itself for the gray level patch of interest, there are 15 types of maximum gray levels on the lower side and 15 types on the upper side, reaching the total of 30 types. It goes without saying that when the number of indices changes, the number of types also varies, and that the same value can sometimes be obtained at small spots with the same index because of a calculation error.

At step S802, the CPU circuit unit 310 makes a decision as to whether the patch to be generated from now is a final patch or not.

Unless it makes a decision at step S802 that the patch to be processed from now is the final patch, it executes step S803. At this step S803, the CPU circuit unit 310 generates gray level values that gradually vary the gray levels from the inside in the subscanning direction by using the maximum gray levels of the respective indices (i) obtained at step S801.

The point (a) shown in FIG. 7 indicates the position which is located N pixels inward from the image edge in the subscanning direction. If the pixel position at the upper side image edge considered here is expressed in terms of the addresses (coordinates) in the main scanning direction and subscanning direction, it is given by (x, y). Thus, the point (a), which is located N pixels inward in the subscanning direction, becomes (x, y−N). Likewise, if the pixel position at the lower side image edge is given by (x, y), the position located N pixels inward in the subscanning direction is represented by (x, y+N). Here, this example employs a coordinate system in which the address value decreases on a pixel by pixel basis in the subscanning direction.

As for the number of pixels N, although the user can determine it arbitrarily through the operating unit 313, it can be set at a fixed value (10 pixels, for example). In the present embodiment, N is fixed at 10 pixels, and the gray level is varied in stages to the edge. As a method of varying the gray level to the edge, a linear calculation can be used, by which the gray level at internal points can be obtained. However, it is also possible, if the maximum gray level and minimum gray level and the original patch gray level are known, to obtain the gray level variations in such a manner as to become convex upward or downward by applying a non-linear quadratic function instead of the linear calculation. In addition, the maximum gray level and minimum gray level can be extended as they are to the N pixel position to create the data. As for the calculation method, the user can select it using the operating unit 313.

Figure 8:
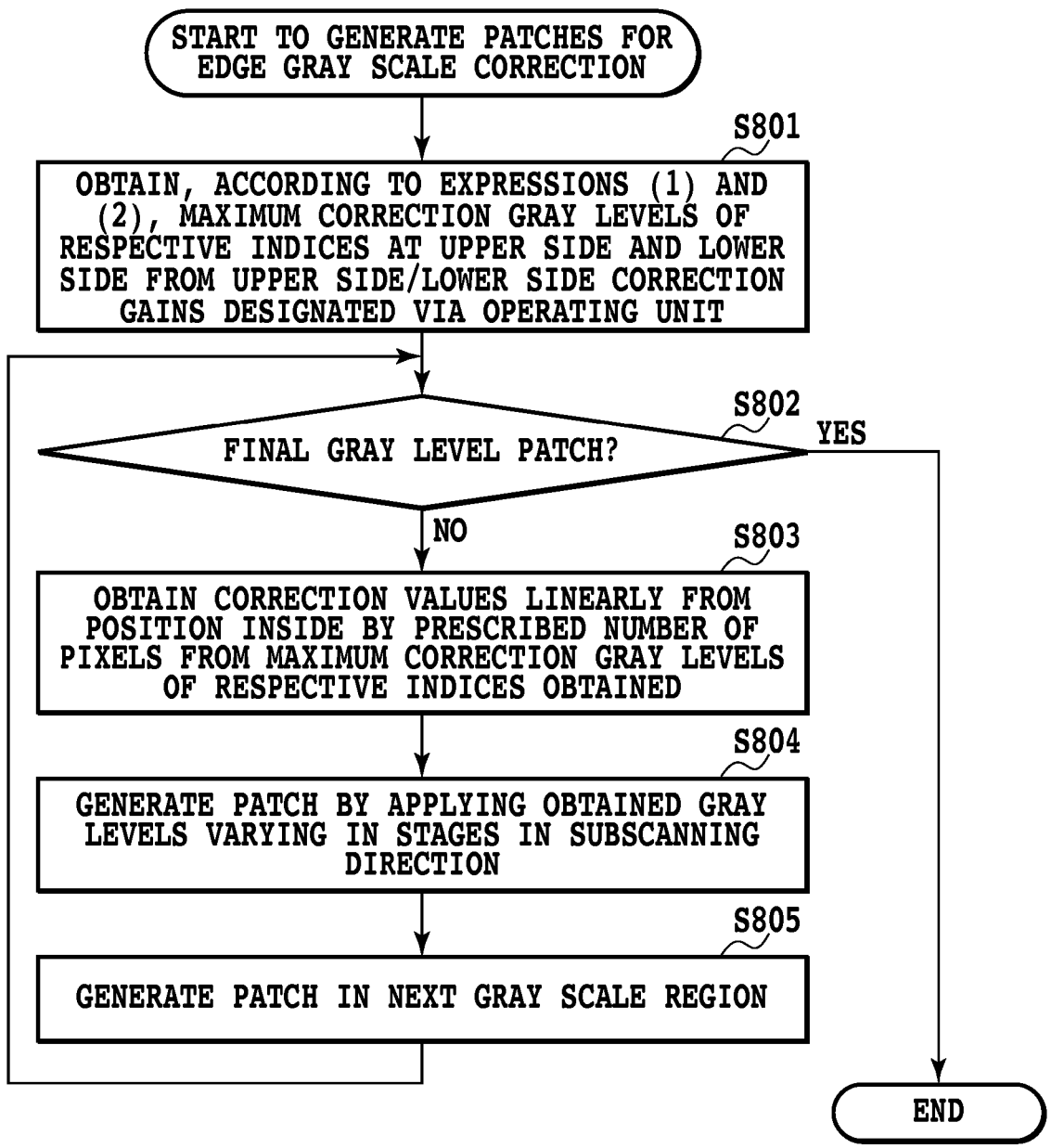
FIG. 8 is a flowchart of generating the patches for the edge gray scale correction as shown in FIG. 7.

At step S804, the image data for forming the patch as shown in FIG. 6 is generated which varies gradually from the positions separated N pixels to the image edges obtained at step S803. In FIG. 6, although the patches are created only for the cyan and magenta colors, the routine shown in FIG. 8 can generate other patches for the edge gray scale correction by applying the routine repeatedly to a plurality of halftone methods and to other colors.

At step S805, after completing the foregoing steps, the processing proceeds to the next patch. After that, the processing returns to step S802, and if there is no other gray level patch to be processed, the processing module is completed. The CPU circuit unit 310 carries out the foregoing calculations for the respective indices (i) by using the RAM 308, and temporarily stores the results in the RAM 308.

Returning to FIG. 5, at step S504, the CPU circuit unit 310 outputs the patches created for the edge gray scale correction (image data) at step S503. As the output, the data temporarily stored in the RAM 308 are delivered to the image processing unit 304 as the CMYK signals. As for the signals delivered, the CPU circuit unit 310 makes only the γ processing 415 and the halftone processing 416 active among the processing modules from the edge gray scale correction processing 414 to the smoothing processing 417, as instructed at step S501, and causes them to process the signals. The signals pass through the other modules that are made inactive and are delivered to the printer 305, and the printing is carried out in response to the signals.

At step S505, as for the patches in the individual gray scale regions of the printed matter output, the operator looks for the portion whose edges have the uniform gray level through inspection. In this case, if the processing from step S502 to step S504 is inappropriate, and the gray level difference is conspicuous, the CPU circuit unit 310 executes the processing again from step S502 in accordance with the prescribed instructions by the operator to do it over again.

At step S506, recognizing the gray level uniformity at the edges of the patch in the object as shown in FIG. 1 at step S505, the operator designates the indices (i) appropriate on the upper side and the lower side in the six gray scale regions for each color using the operating unit 313 (gray scale region selecting unit). Thus, the apparatus accepts the selection input of the indices selected as appropriate by the operator through the operating unit 313.

For example, as for the 20% patch of cyan, if the gray scale difference in the gray level does not occur at the edges originally, the index (0) is input for both the upper side and the lower side. As for the 40% patch of cyan, the index (5) is input for the upper side, and the index (3) is input for the lower side, for example. In this manner, the selection of the indices varies according to the conditions of the printer to which they are output.

At step S507, the CPU circuit unit 310 interprets the index values designated through the operating unit 313 at step S506. Then, the edge gray scale correction processing 414 utilizes the correction gain value retained in the RAM 308 at the data generation at step S502. For example, if the index (3) is selected at the lower side, the correction gain=1.04 at the lower side of the gray scale region with the gray level 40% is set in the prescribed register of the edge gray scale correction processing 414 as the representative correction gain.

[Application of Edge Correction Values]

Next, the edge gray scale correction processing to which the edge correction values are applied will be described.

Figure 10:
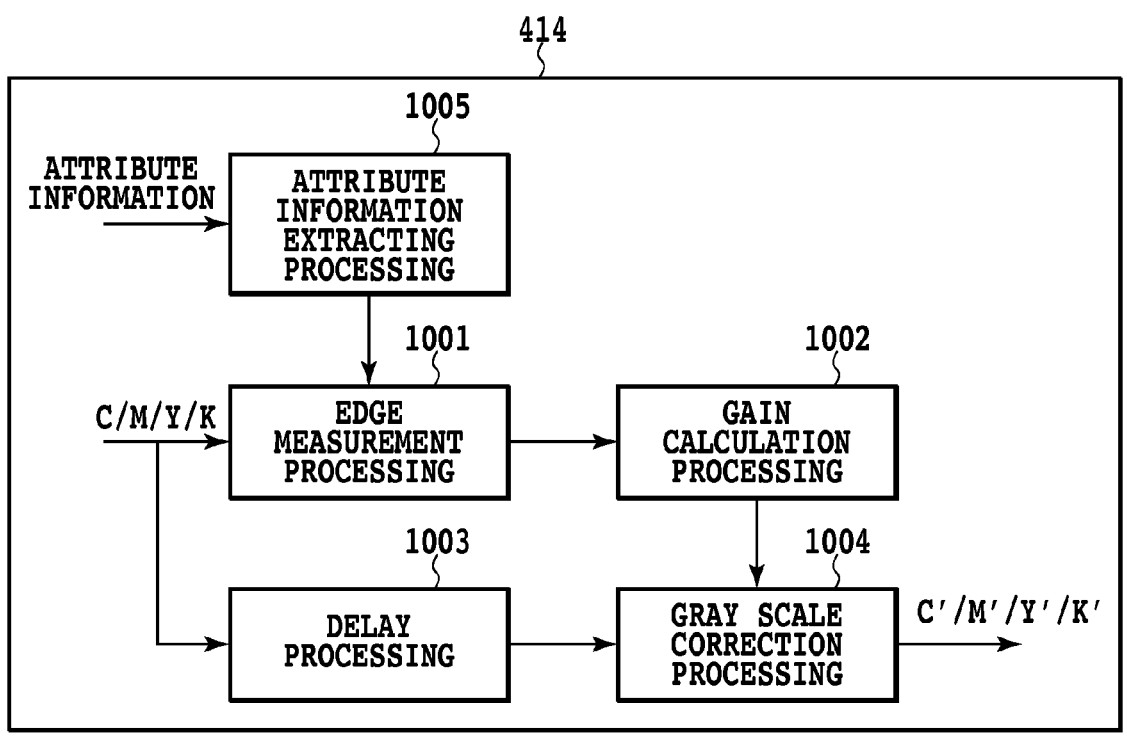
FIG. 10 is a block diagram of the edge correction processing in accordance with the present invention.

FIG. 10 is a block diagram of the edge gray scale correction processing 414 for reflecting the representative correction gain values obtained as described above on the image edges.

The edge gray scale correction processing 414 can handle the output signals from the previous output color space converting processing 412, the image signals in the CMYK space retained in advance in the storage unit 317, or the image signals in the CMYK color space transmitted via the network 314. In addition, it can adaptively handle the processing target image according to the attribute information. The term "attribute information" refers to information for dividing the object in the image into individual objects in accordance with the image characteristics such as an image, graphics, text, line and the like.

Generally, a PDL developing unit 308 generates the attribute information from a command of a PDL language, which is delivered through a driver (not shown) by a job executed in a PDL format. As for the attribute information generated, although it may sometimes be delivered to the post-stage processing as it is, it can be managed and stored as a file format together with the image data after development by the PDL developing unit 308. In this case, it is stored in the storage unit 317 in its file format. First, the signals in the input CMYK color space are delivered to edge measurement processing 1001 and delay processing 1003. The delay processing 1003 is a circuit for matching the amount of delay of the signals in the subscanning direction in the image processing unit after the correction values of the image edges have been determined in the end. Usually, it is implemented by a FIFO or line memory.

The edge measurement processing 1001 is applied to the image data having the attribute such as text/graphics/line among the input CMYK images. The attribute information that the attribute information extracting processing 1005 handles is expressed as 4-bit attribute (object) information for the individual pixels of the decompressed CMYK images. In the present embodiment, according to the 4-bit information delivered from the attribute information extracting processing 1005, the edge measurement processing 1001 is applied only to a bit string expressing the graphics, text or line. Here, FIG. 11 shows an example of the attribute information the present embodiment supposes.

The attribute information extracting processing 1005 makes a decision of the attribute (object) the bit string indicates by interpreting the relationships between the bit strings and the objects as shown in FIG. 11 for the input bit strings, and supplies its results to the edge measurement processing 1001 and the gain calculation processing 1001 on a pixel by pixel basis. In addition, the attribute information extracting processing 1005 can alter the attribute information on the objects, to which the gray scale correction processing of the image edge is applied, by register settings (not shown).

Figure 12:
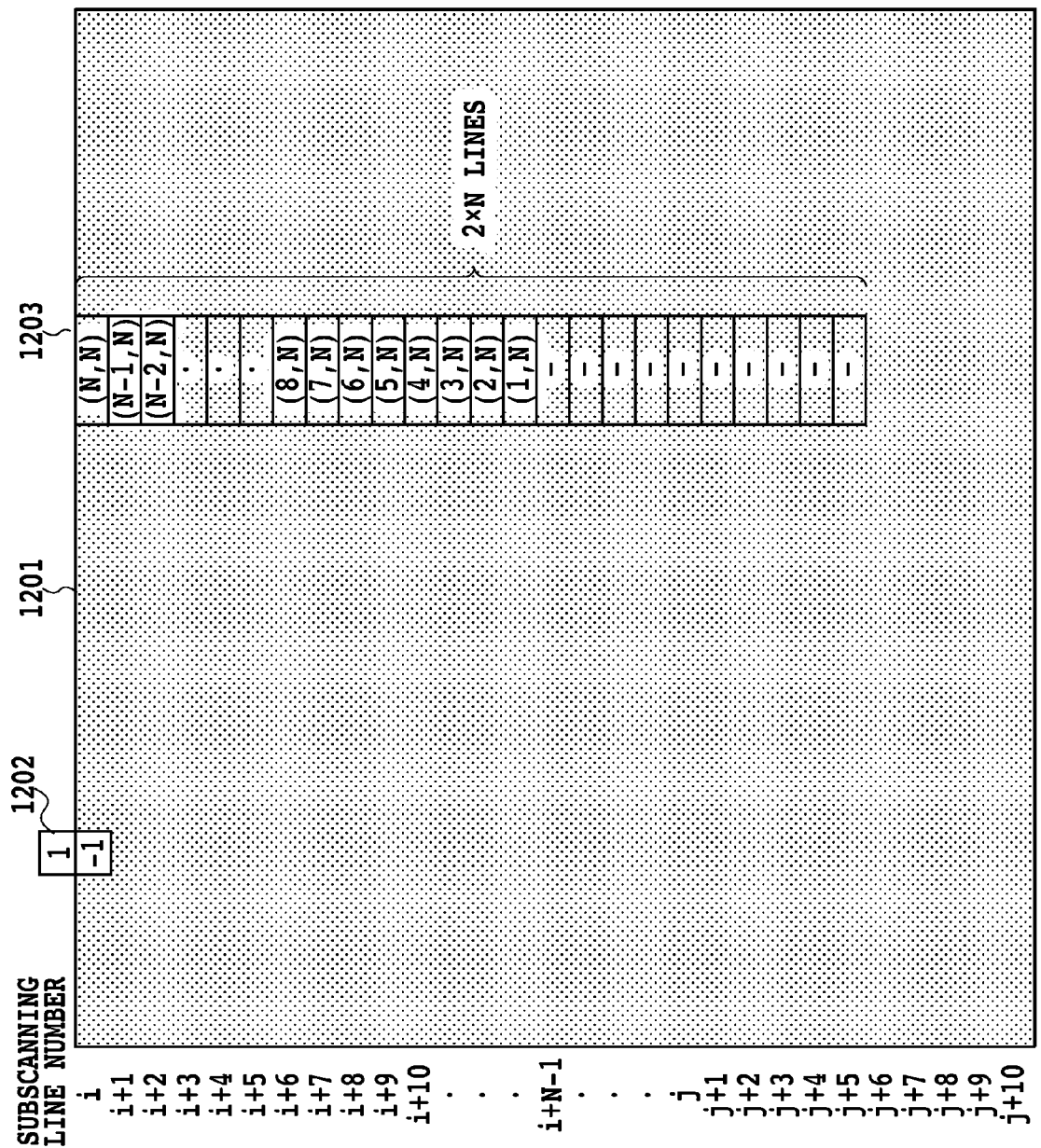
FIG. 12 is a schematic diagram illustrating the edge measurement processing which will be explained in the embodiments 1 and 2 in accordance with the present invention.
Figure 13:
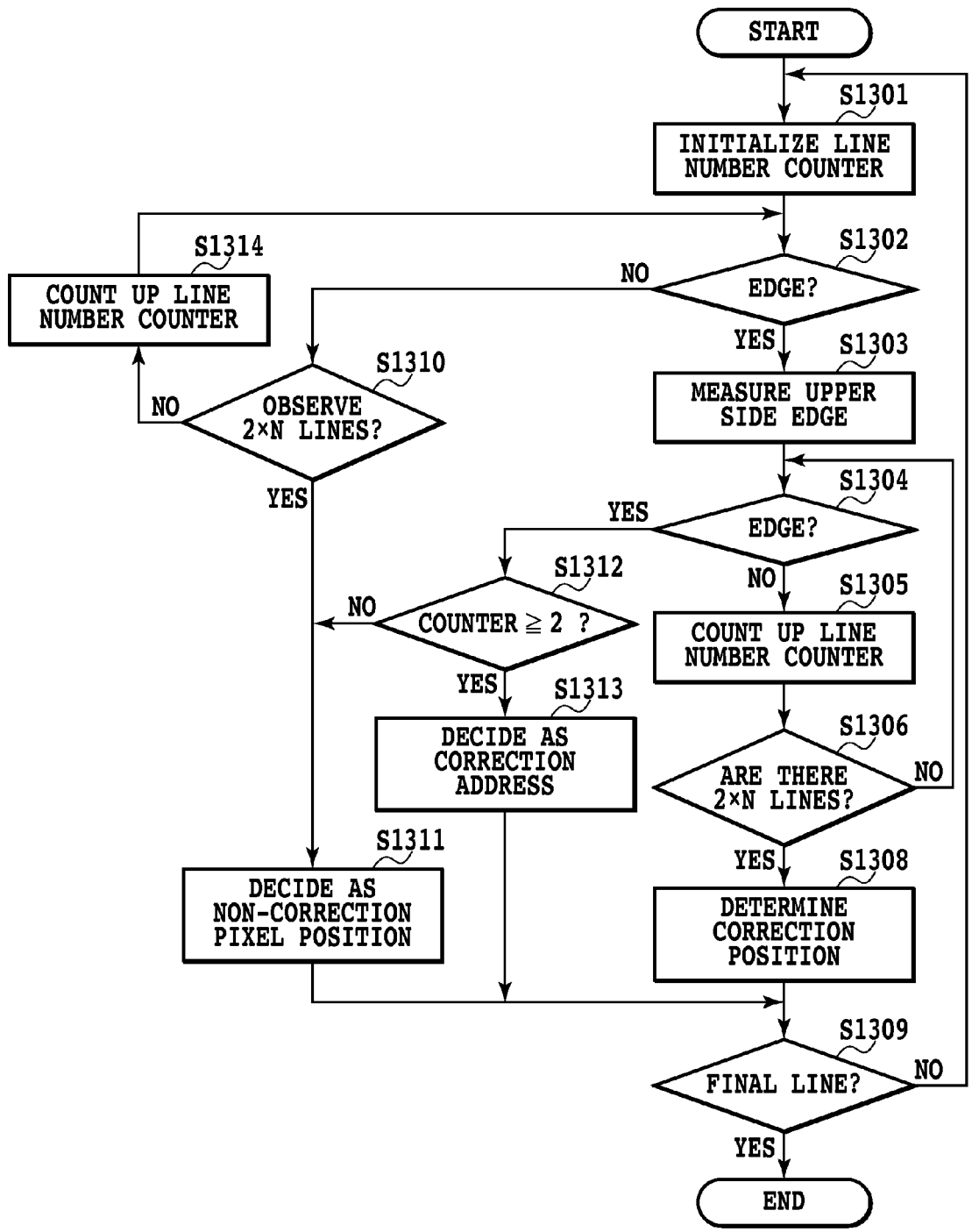
FIG. 13 is a flowchart of the edge measurement processing which will be explained in the embodiments 1 and 2 in accordance with the present invention.

The edge measurement processing 1001 processes the input CMYK signals for each color. FIGS. 12 and 13 show the state in which the processing measures the distance of the object of interest from the subscanning direction edge. A patch 1201 of FIG. 12 has a uniform signal component with a signal value=118 (about 46%). A filter 1202 is a differential filter for edge detection. In addition, the leftmost column of FIG. 12 indicates the line number of the patch 1201 in the subscanning direction. It expresses the line number from the upper end such as ith, (i+1)th, (i+2)th, . . . , (i+N)th from the top. As for the lower side, it shows the line information down to the lower end such as jth, (j+1)th, . . . , up to (j+10)th.

[Processing Flow of Edge Measurement Processing 1001]

Next, a processing flow of the edge measurement processing 1001 (edge measurement unit) will be described with reference to FIG. 13. In this processing, it is decided as to whether a pixel of interest is a correction target pixel or not according to the three factors: the edge amount, the object information, and the line width of the pixels of interest. In particular, the line width, or the image width in the subscanning direction that should be corrected, can be set in advance. In the present embodiment, it is set at N pixels (in the subscanning direction: where N is an integer not less than six).

The processing contents of the individual steps in the processing flow will be described below.

Step S1301 (Initialization of line number counter): Reset an internal counter for counting the line number in a correction target region at an edge.

Step S1302 (Edge detection): Extract the upper side edge to detect the upper side edge of the patch. Here, consider the ith line of the pixels of interest. The edge amount on the ith line is determined by the filter 1202 according to the following Formula (4), where the pixel of interest is denoted by (x, i).

$$\text{Edge amount}(x,i) = \text{pixel value}(x,i-1) + (-1) \times \text{pixel value}(x,i) \quad (4)$$

If the absolute value of the edge amount is not less than a prescribed threshold (TH), a decision is made that the pixel of interest has the edge. As for the decision of the edge, a further description will be made by way of concrete example. Here, assume that the threshold TH=10. In addition, the gray level of the patch 1201 is 118 as mentioned above. In this case, the edge amount is as follows.

$$(\text{Example})\text{Edge amount}(x,i) = 0 + (-1) \times 118 = -118$$

In the example, since |the edge amount(x, i)|≧10, (x, i) is decided as an edge region.

Step S1303 (Detection of upper side edge): If a decision is made at step S1302 that the pixel of interest is an edge (=YES), the internal counter is incremented, and the measurement is started from the upper side edge.

Step S1304 (Edge detection): After that, detection of an edge is carried out in the subsequent subscanning direction.

Step S1305 (Line number counting): Unless the edge is detected at step S1304 by the method shown at step S1302, the internal counter for counting the line width from the upper side edge is counted up. The edge detection at step S1304 is carried out in the same manner as in the foregoing S1302 to obtain the edge amount at (x, i+1). Within the patch, the edge amount calculated becomes "0". Accordingly, the region is a non-edge region and hence +1 is added to the internal counter not shown.

Step S1306 (Decision of measuring 2×N lines): The processing is executed for 2×N lines from the point where the edge is observed in the subscanning direction. If 2×N lines exist from the point where the edge is observed, the next step S1308 is executed, and unless 2×N lines is fulfilled, the processing is repeated from step S1304.

Step S1308 (Decision of correction position): The reference numeral 1203 in FIG. 12 designates the result thereof, and (N, N) representing the edge is generated for the ith line. The details of the numerical value in parentheses will be described later. In the example of FIG. 12, since the line width of 2×N lines is reserved from the upper side edge, as for the pixels for N lines from ith to (i+N−1)th line, the information on the pixels of interest (*, N) is delivered to the gain calculation processing 1002 which will be described later on a pixel by pixel basis as the correction target pixels. Here, the symbol "*" denotes integers from one to N. As for the pixels which are not a correction target, (0, 1) is transmitted as the information on the pixel of interest as will be described later.

In this way, as to whether the pixel of interest is to be corrected or not, a basic algorithm is that the correction position is determined only after the line width of twice the line width N of the image edge to be corrected is observed (exceptional processing will be described below).

The reason for using such an algorithm is as follows. For example, if the image of interest has a width of 13 pixels, and the line number N of the region to be corrected is assumed to be 6 pixels, the gray level of 6 pixels from the upper side edge is gradually varied toward the inside. In addition, it is necessary to gradually vary the gray level of the upper side 6 pixels from the lower side edge of the 13 pixels in the same manner. To decide the upper side 6 pixels as the correction region, however, twice the image width is necessary. This is because the lower side edge must not to exist in the twice the image width.

In this way, detection of the edge amount is being carried out in the subscanning direction. Thus, when the lower side edge is detected at the (j+10)th line, the upper side N pixels from the (j+10)th line are considered as the pixels to be corrected, and are delivered to the gain calculation processing 1002 which will be described later in the same manner as in the upper side case as the information on the pixels of interest (*, N) at the lower side edge. As for the other regions, as the information on the pixels of interest whose edge gray scale is not corrected, (0, N) is delivered.

Next, the numerical values in parentheses to be delivered as the information on the pixels of interest will be described.

As for q in (p, q), it indicates the line width confirmed in the foregoing processing. According to step S1303, since the prescribed image width N corresponding to the N lines from the upper side edge is assured, it is determined at q=N. If only the width less than N lines is present, q equals that line width and is delivered. As for p, it indicates the distance from the center to the edge pixel. Accordingly, for the ith line indicating the edge p becomes N, and at the innermost position p becomes p=1. The numerical value p representing the distance is utilized by the gain calculation processing 1002 which will be described later.

Step S1309 (Confirmation of final line): The decision processing is successively executed in the main scanning direction of the processing target image to make a decision as to whether the line reaches the final line. If it is the final line (=YES), the processing is completed. Otherwise (=NO), the processing is repeated from step S1301.

Here, the description is returned to the edge detection at the foregoing step S1302. Unless the edge detection at this step finds out an edge (=NO), the processing proceeds to the next step S1310.

Step S1310 (Decision of measuring 2×N lines): In the same manner as at step S1306, a decision is made as to whether 2×N lines are measured. If 2×N lines are measured, the processing proceeds to step S1311, and if 2×N lines are not fulfilled, the processing proceeds to step S1314.

Step S1311 (Decision as non-correction pixel position): The region of interest (N lines from the counter reset position) is made a non-correction (non-correction target) pixel position (p="0"), and the information on the pixel of interest is delivered to the post-stage gain calculation processing 1002.

Step S1314 (Count up line number counter): To advance the processing to the next line, the internal counter is incremented.

Step S1312 (Behavior of count value less than 2×N lines): When the count value is less than 2×N lines, and when the width of the target object is not less than two lines, the processing is executed according to the next step S1313. In contrast, when the width of the target object is less than two lines, that is, when the width of the target object is one pixel, the processing is executed according to step S1311.

Step S1313 (Decision as correction position): A method of deciding the information on the pixel of interest (p, q) will be described in the case where the width of the target object is not less than two at step S1312 and is less than 2×N lines. First, the calculation method of p and q varies depending on whether the counting number decided at this step is an odd number or an even number.

First, as a case of the odd number, an example of counting result of five lines will be described (see FIG. 14).

When the count value is five lines, the subscanning line numbers are 1, 2, 3, 4 and 5 as shown in FIG. 14. In this case, q is obtained as q=r=(counter value (=5)/2)=2 (rounded down to the nearest whole number). In contrast, as for p, the calculation method differs in the case where p is equal to or less than the center line=(counter value/2)+1=5/2+1=3, and in the other cases. The division result in this case is rounded down to the nearest whole number.

If the subscanning line number of the center line is three or less, p is obtained by r+1−line number of interest, otherwise, it is obtained by r−(counter value−line number of interest).

Then, as shown in FIG. 14, p is obtained as follows: for the first line, p=2+1−1=2; the second line, p=2+1−2=1; the third line, p=2+1−3=0; the fourth line, p=2−(5−4)=1; and the fifth line, p=2−(5−5)=2.

Next, a case of even number counting (=4) will be described with reference to the example of FIG. 15.

In this case, the subscanning line numbers are 1, 2, 3 and 4, and the counter value indicates 4. As for q, it is the same as with the odd number. As for p, as in the case of the odd number, the processing differs, depending on whether it is below the center line or not. In the case of the even number counting, since the center line does not exist, the processing is divided at the center obtained by center line=(counter value/2)=2. A method of obtaining p after the division is the same as in the case of the odd number. For reference, results are shown in FIG. 16 (in the case of three lines) and FIG. 17 (in the case of two lines).

[Correction Gain Calculation Processing 1002]

Next, the gain calculation processing 1002 (correction gain calculation unit) will be described.

The gain calculation processing 1002 receives the output of the previous edge measurement processing 1001 as its input. In addition, as a reference value for deciding the correction gain value, it determines the correction gain value in the pixel of interest in the end using the colors, screen classifications, and the upper side correction gain value and the lower side correction gain value in the gray scale regions, which are determined by [Generation of Edge Correction Value]. The gain calculation processing 1002 is a processing module for executing such processing.

First, as for a pixel (p="0") whose attribute information indicates that it is not an object to which the correction is applied, or as for a pixel (p="0") as to which the edge measurement processing informs that it is a non-correction pixel, the gain calculation processing 1002 places the correction gain value at 1.0, and informs the post-stage gray scale correction processing 1004 of it.

The foregoing processing is performed in accordance with the attribute information extracted by the attribute information extracting processing 1005, and is applied only to the pixels of an object to be corrected. As for the pixels other than the correction target, the edge measurement processing 1001 delivers (p, q)=(0, 1) as the information on the pixel of interest, in which case the correction gain value is placed at 1.0.

Figure 18:
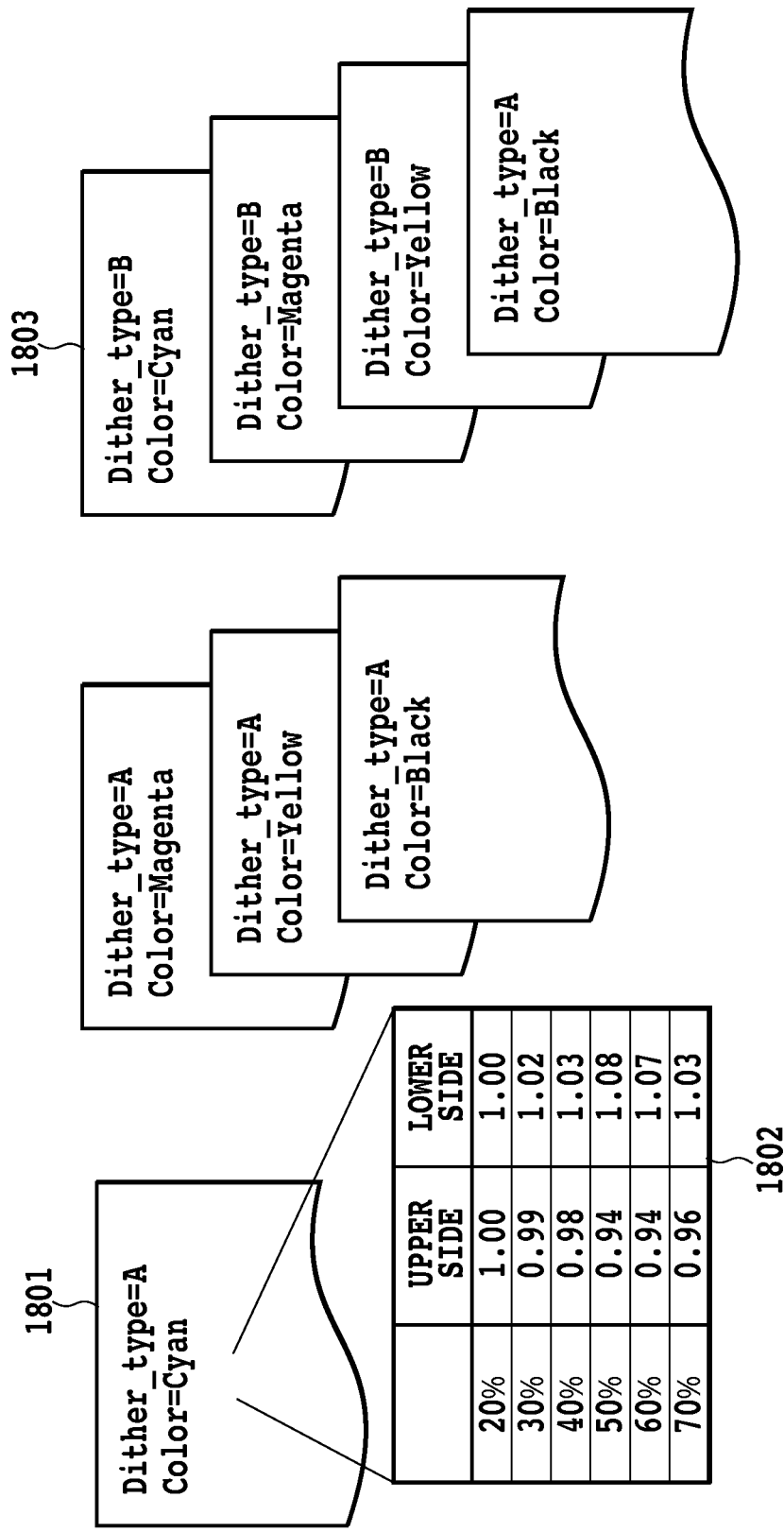
FIG. 18 shows a management example of representative correction gains generated in the embodiments 1 and 2 in accordance with the present invention.

The gain calculation processing has an internal register not shown which stores the upper side and lower side correction gain values (that is, the upper side correction gain values and the lower side correction gain values) in the gray scale region of interest as mentioned above. FIG. 18 shows the state. The reference numeral 1801 denotes data information on cyan in dither type (Dither type)=A calculated in the foregoing [Generation of Edge Correction Value], which expresses the dither type and color as management information.

The reference numeral 1802 denotes the representative correction gain values for respective gray scale regions on the upper side and lower side. As for a dither type=B designated by the reference numeral 1803, similar data are stored in the same data format. In this way, the representative correction gain values can be managed in accordance with the colors and the image forming patterns (such as dither type and screen type). In the example 1802 of FIG. 18, for the sake of clarity, the vertical axis expresses the gray scale regions, the horizontal axis the up and down directional information (the upper side/lower side), and the content data describe the correction gain values as they are. In practice, however, the edge gray scale correction processing 414 assigns numerical values suitable for the operation of hardware and software to utilize them.

Figure 19:
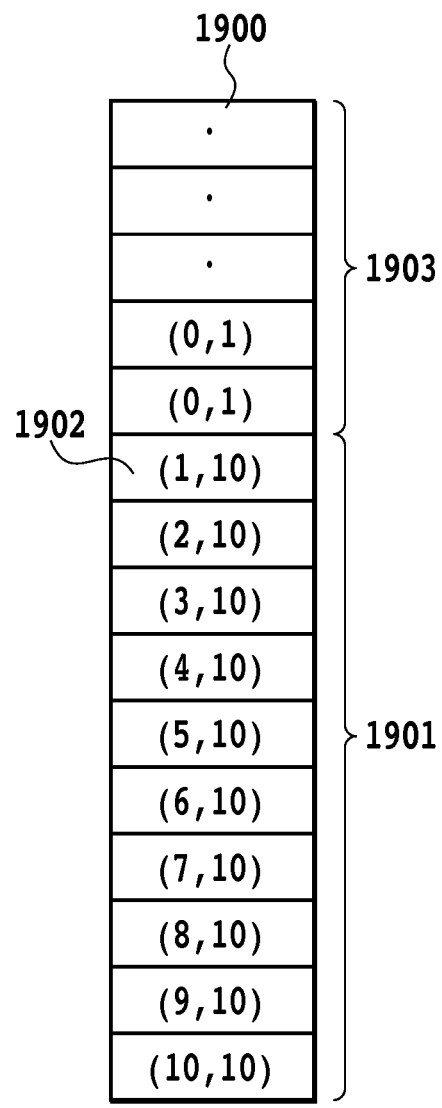
FIG. 19 shows an example of information on pixels of interest used for calculating the correction gain which will be explained in the embodiments 1 and 2 in accordance with the present invention.

A concrete calculation method of the correction gain values of the pixels of interest to be processed will now be described using the information on the pixels of interest as shown in FIG. 19.

In an LUT 1900 delivered to the gain calculation processing 1002, the reference numeral 1901 designates a lower side edge, reference numeral 1902 designates a pixel whose correction effect is minimum, and reference numeral 1903 designates pixels that are not corrected. Using the values (p, q) makes it possible to obtain the final correction gains in the pixels of interest by the following Formula (6).

$$\text{Final correction gain}(x,y) = \{1.0 \times (q-p) + (\text{real correction gain}) \times q\}/q \qquad (6)$$

FIG. 20 shows an example of the LUT for obtaining the real correction gains to be applied to Formula (6).

As shown in FIG. 20, the numerical values of the representative correction gains, which have been indefinite for all the gray scale regions, are defined for all the gray scale regions continuously with the relationships as shown in FIG. 20. FIG. 20 sets, for the gray scale regions designated by the reference numeral 1802, the maximum correction gain of 1.0 for the first gray scale region from 0% to 20% forcedly, and the maximum correction gain equal to that at 70% from 70% and greater. As for the remaining correction gains in the gray scale regions between the designated gray scale regions, they are set according to the rule of using the observed results as they are. The correction gains created according to the rule are referred to as the real correction gain in the present embodiment.

Although the present embodiment creates the real correction gains by the replacement described above, it can also obtain the real correction gains which have been indefinite in the intermediate gray scale regions by linear interpolation based on the percentage of the gray scale regions.

Finally, using the representative correction gains generated by the gain calculation processing 1002, the gray scale correction processing 1004 obtains the gray levels after the correction for the gray scale regions of interest by the following Formula (7).

$$\text{Gray level after correction val}(x,y) = \text{Original gray level } v(x,y) \times \text{Final correction gain}(x,y) \qquad (7)$$

where (x, y) represents the position of the correction target pixel.

With the foregoing processing, concerning the object designated, the present embodiment can achieve the gray scale correction in accordance with the directional characteristics in the up and down direction, thereby correcting the image at the edges.

Embodiment 2

Next, a second embodiment in accordance with the present invention will be described. In the following, only different portions will be explained while omitting the same configuration as the foregoing embodiment 1.

In the embodiment 1, to grasp the gray scale characteristics in the up and down direction, the patches are output, and the necessary correction levels are visually determined from the output patches. In the present embodiment, although the patches are generated in the same manner as in the embodiment 1, the output results are read with a reading device. Thus, the present embodiment is characterized by detecting the correction levels constituting the smooth gray scale automatically.

[Generation of Edge Correction Value]

The generating processing of the edge correction value will be described with reference to FIG. 21.

Figure 21:
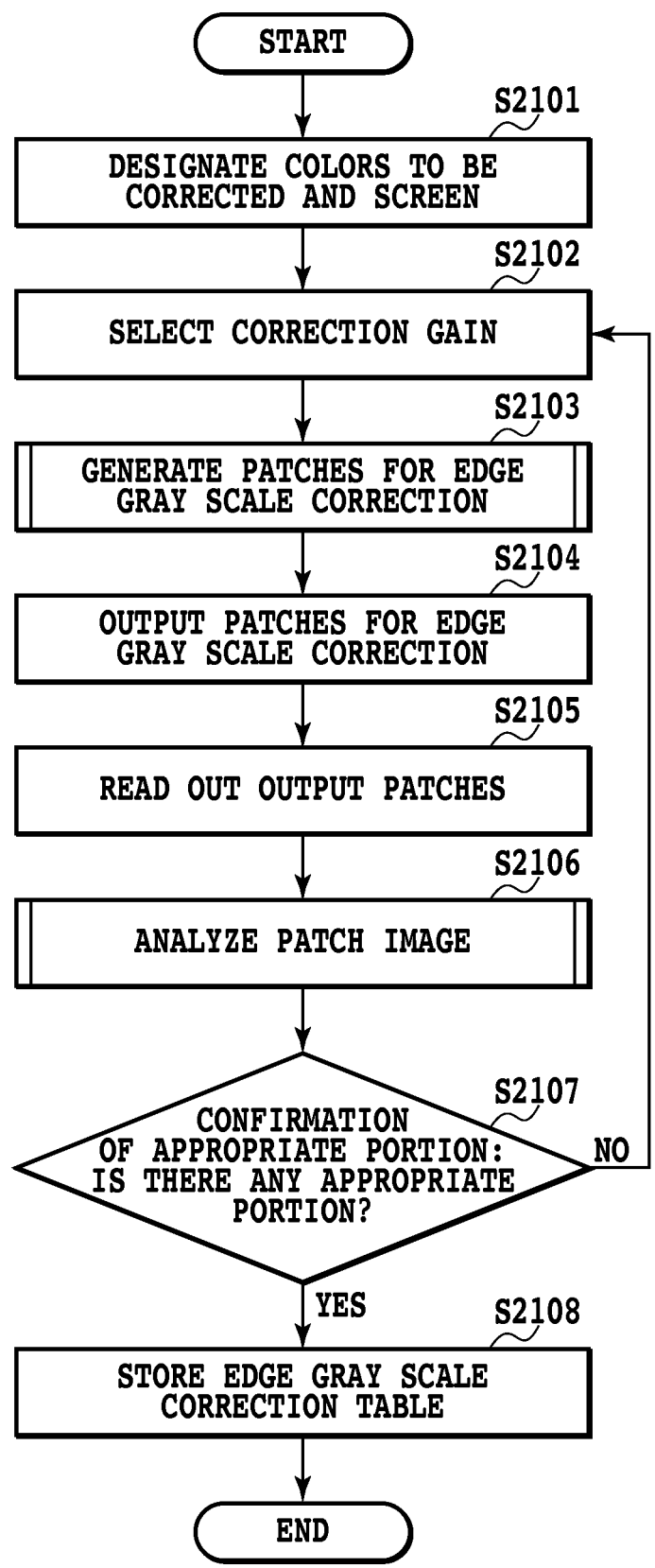
FIG. 21 is a flowchart of generating the correction values in the embodiment 2 in accordance with the present invention.

FIG. 21 is a flowchart showing the generating processing of the edge correction value in the present embodiment.

First, at step S2101, the input is accepted for designating the colors (cyan, magenta, yellow and black) to be corrected and the screen type used in the halftone, which are assigned through the operating unit 313. Here, the designated colors and the screen type are once retained in the RAM 308 of the CPU circuit unit 310 temporarily. The following processing is achieved by the CPU circuit unit 310.

Next, at step S2102, to generate the patch data for edge correction described with reference to FIG. 6, the CPU circuit unit 310 selects the correction gains prepared in advance for generating a variety of gray levels (correction values) for the gray scale regions of interest.

Figure 22:
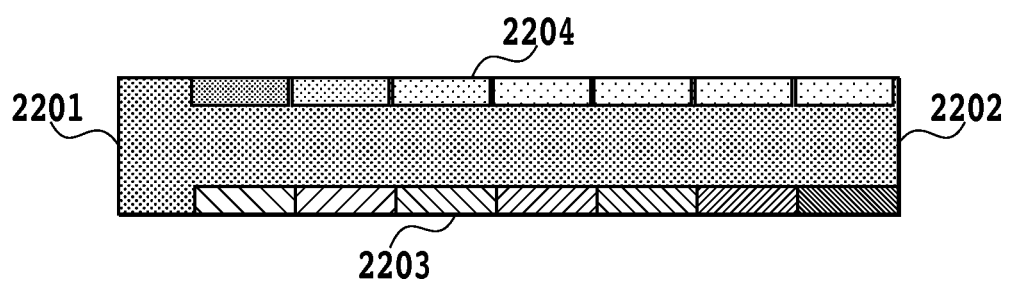
FIG. 22 is an example of creating a patch in a chart which will be explained in the embodiment 2 in accordance with the present invention.

FIG. 22 is a diagram showing the conditions of one of the patches described in connection with FIG. 6. As compared with FIG. 7 of the embodiment 1, FIG. 22 differs in that the 16 grade scales from 0 to 15 are not placed at the upper and lower parts of the patch, while the remaining arrangement state of the data is the same as that of FIG. 7. In the present embodiment, it is also assumed that the edge characteristics as shown in FIG. 1 are confirmed (the upper side is output thickly and the lower side is output thinly). Thus, as shown in FIG. 22, the grades are arranged in such a manner as to become gradually thinner in the main scanning direction with respect to the original gray level on the upper side, and to become gradually thick on the lower side. In FIG. 22, although the indices are not clearly shown on the data, it should be noted that the portion corresponding to the index 0 has the original gray level of the patch as in FIG. 7.

The correction gains designated at step S2102 are those that specify the maximum correction gains at the time when the correction gains are divided into 16 grades.

The present embodiment can set upper and lower side maximum correction gains independently for each patch gray level designated (6 grades in FIG. 6). The processing at this step S2102 is substantially the same as the processing at step S502 of the embodiment 1. At the following step S2103, the same operation as that at step S503 is executed to generate the patches for the edge gray scale correction.

Next, at step S2104, the patches (image data) for the edge gray scale correction generated at step S2103 are output. As for the output, the data stored in the RAM 308 temporarily are delivered to the image processing unit 304 as the CMYK signals. As for the signals delivered, the CPU circuit unit 310 makes only the γ processing 415 and halftone processing 416 active among the processing modules from the edge gray scale correction processing 414 to the smoothing processing 417 as instructed at step S501, and causes them to process the signals. The signals pass through the other modules that are made inactive and are delivered to the printer 305, and the printing is carried out in response to the signals.

At step S2105, the color scanner unit reads the patches output in response to a pushing down of the scanning button of the operating unit 313 by the operator who has set the output printed sheet on the image reading unit 309.

Figure 23:
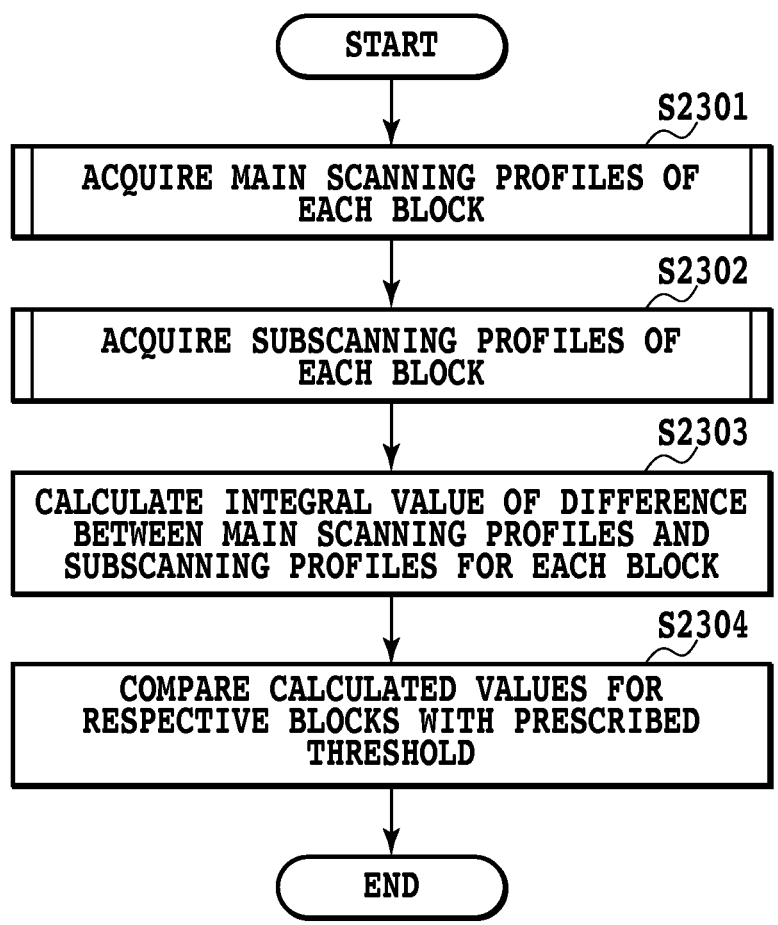
FIG. 23 is a flowchart of the analytic processing of the patch image in the embodiment 2 in accordance with the present invention.
Figure 24:
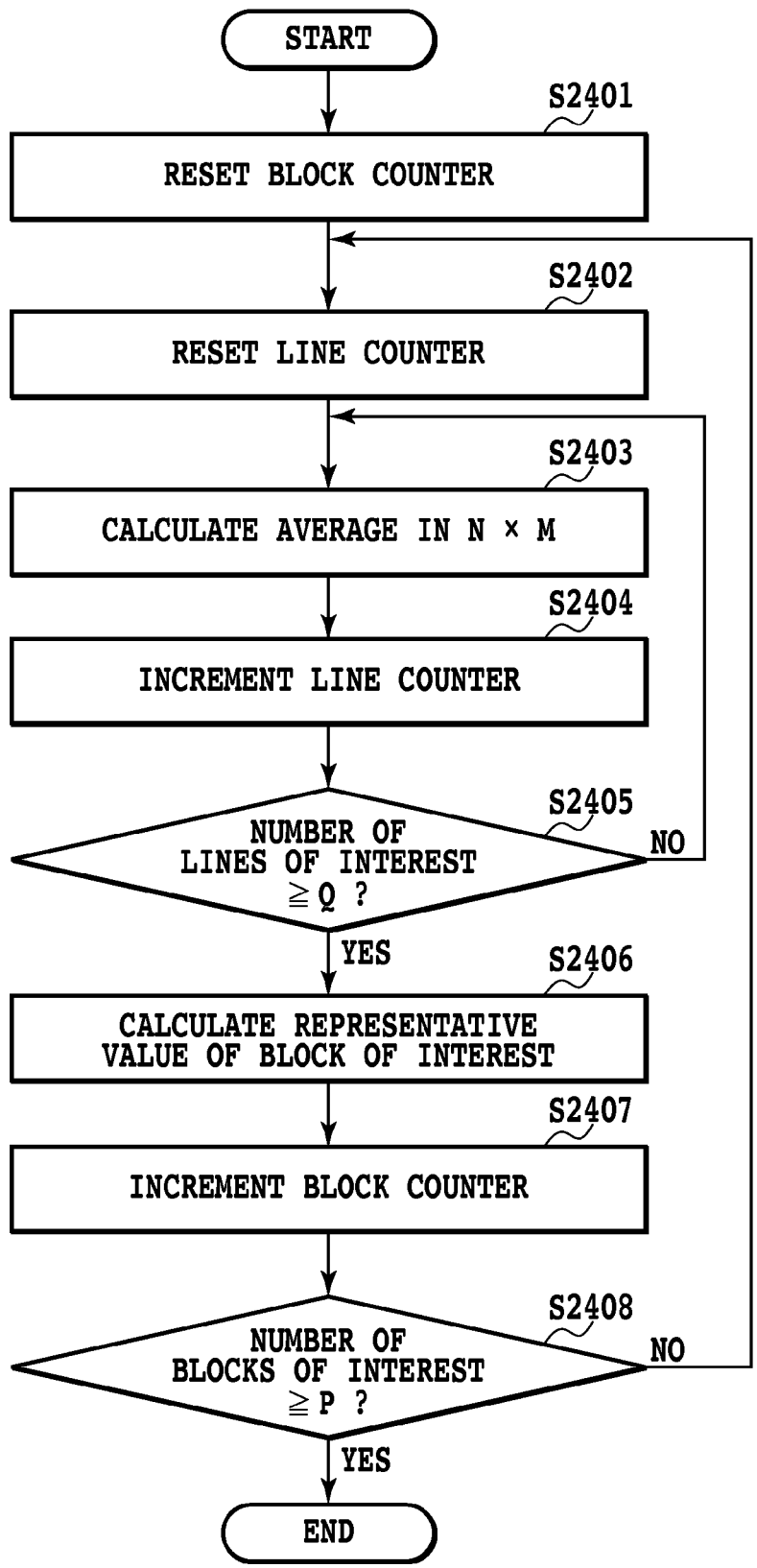
FIG. 24 is a flowchart of the analytic processing of the patch image in the embodiment 2 in accordance with the present invention.
Figure 25:
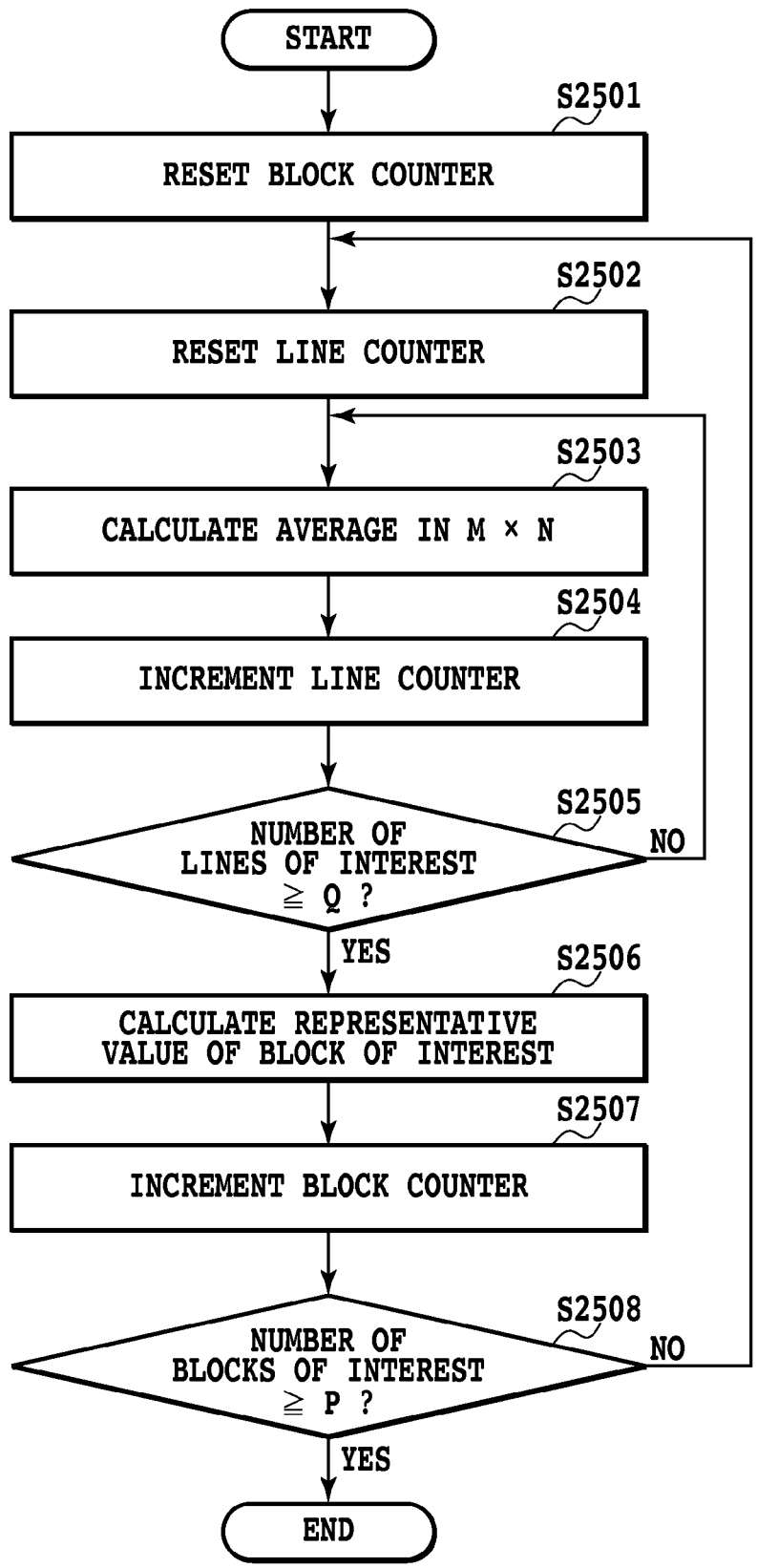
FIG. 25 is a flowchart of the analytic processing of the patch image in the embodiment 2 in accordance with the present invention.

At step S2106, the patch image read out is analyzed (gray scale region detecting unit). FIGS. 23, 24 and 25 are flowcharts showing a processing flow of the analytic method, which will be described here in detail.

Step S2301: Acquire profiles in the main scanning direction from the patch data obtained. The profiles mentioned here indicate the gray scale characteristics at the edges in the main scanning direction, that is, the left side edge 2201 and the right side edge 2202 of FIG. 22 (the details of which will be described later).

Here, details of the profile acquiring processing will be described with reference to FIG. 24. FIG. 24 is a processing flow for explaining the details of the profile acquisition.

At step S2401, the CPU circuit unit 310 measures the data as shown in FIG. 6 on a block by block basis (the block is a patch designated in the gray scale region of each color). In this case, to observe which block is being measured, the CPU circuit unit 310 has a block counter therein, and resets the counter at the start of the processing. Incidentally, as for the example of FIG. 6, the profiles of 12 blocks in total, six cyan blocks and six magenta blocks, are measured from the sheet of the image.

Step S2402: To obtain the characteristics of the edge 2201, the present embodiment acquires the data (gray level) of 20 pixels in the main scanning direction and 10 lines in the subscanning direction by the following method, and obtains the representative gray scale characteristics (profile). At this step, a line counter (internal counter) for measuring the 10 lines in the subscanning direction is reset at the start of the processing.

Figure 26:
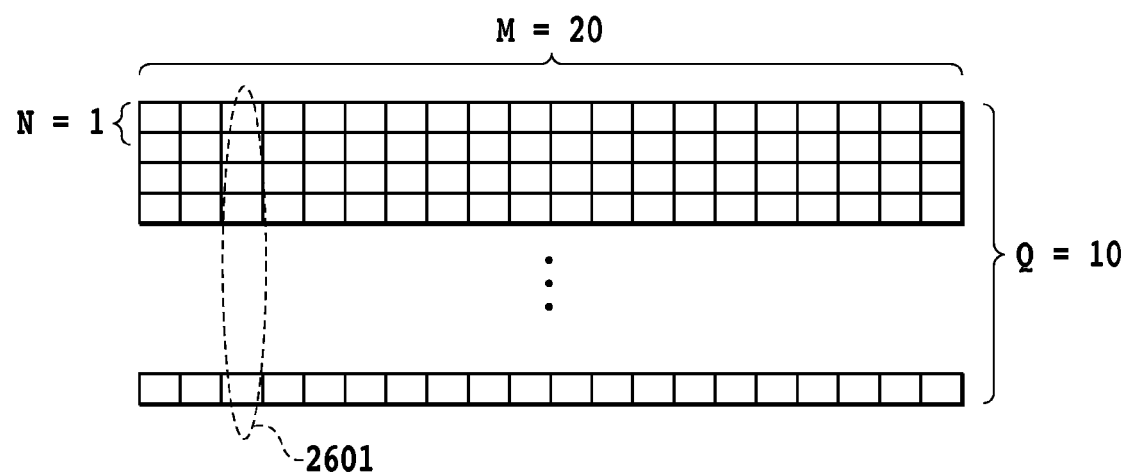
FIG. 26 is a schematic diagram illustrating main scanning profile calculation in the embodiment 2 in accordance with the present invention.

Step S2403: As for lines of interest, the average value in the subscanning direction is obtained at the individual positions in the main scanning direction in a window with the size of N×M pixels. In the example of FIG. 26, since it is assumed that N=1 pixel and M (the width in the main scanning direction)=20 pixels, only one pixel is present in the subscanning direction. Thus, the result is the same eventually regardless of obtaining the average value or not.

Step S2404: To advance the position to the next main scanning line, the CPU circuit unit 310 increments the line counter and transfers the processing to the next main scanning line.

Step S2405: The CPU circuit unit 310 makes a decision as to whether the processing proceeds by Q lines in the subscanning direction as a result of the processing at the foregoing steps S2403 and S2404. Although Q is set at Q=10 lines here, Q is not limited to the value. If the decision is "YES", the processing proceeds to step S2406, and if the decision is "NO", it proceeds to step S2403.

Step S2406: If the CPU circuit unit 310 collects the edge characteristics (gray levels) by the amount of Q lines, it obtains the representative value which is the average of the average values obtained at step S2403 in the subscanning direction at the position of interest in the main scanning direction (main scanning position), which is enclosed as denoted by the reference numeral 2601 of FIG. 26. In the example of FIG. 26, since the average value at each main scanning position is calculated, the one side (left side) main scanning profile corresponding to the M (=20) pixels in the block of interest is created.

At step S2407, the CPU circuit unit 310 increments the internal block counter for managing the number of blocks to shift the processing to the next block (FIG. 6) in the subscanning direction.

At step S2408, according to the number of blocks incremented at step S2407, if the CPU circuit unit 310 has processed the prescribed number of blocks (=P) (six blocks per color in the present embodiment), it completes the processing, and unless it reaches P, it continues the processing from step S2402, again.

The CPU circuit unit 310 executes the foregoing processing steps for each screen and color designated to create the left side main scanning profile. Applying the foregoing individual steps to the right side edge in the same manner makes it possible to create the right side profile, and thus to create the profile of 40 pixels in the main scanning direction.

The reason for creating the main scanning profiles is that the main scanning sides exhibit effective edge characteristics as the reference data to confirm the degree of deterioration at the edges in the subscanning direction. Since the edges in the main scanning direction have the edge characteristics with small deterioration, like phenomena such as sweep up and solid black with white microdots and the like, which are apt to occur in the subscanning direction, the CPU circuit unit 310 carries out the processing of acquiring the profiles at the edges in the main scanning direction in advance by making use of the edge characteristics in the present embodiment.

The foregoing is the detailed description of the profile acquiring processing at step S2301.

After that, step S2302 is performed following the foregoing processing at step S2301.

Step S2302: This step is the processing of acquiring the edge characteristics in the subscanning direction, which are designated by the reference numerals 2203 and 2204 in FIG. 22, after the processing described at step S2301. FIG. 25 shows a processing flow thereof. Here, the details of the processing of acquiring the edge characteristics in the subscanning direction will be described with reference to FIG. 25.

At step S2501, the CPU circuit unit 310 measures the data as shown in FIG. 6 on a block by block basis (the block is a patch designated in the gray scale region of each color) in the present embodiment. In this case, to observe which block is being measured, the CPU circuit unit 310 has a block counter therein, and resets the counter at the start of the processing at this step S2501. Incidentally, as for the example of FIG. 6, the profiles of 12 blocks in total, six cyan blocks and six magenta blocks, are measured from the sheet of the image.

Figure 27:
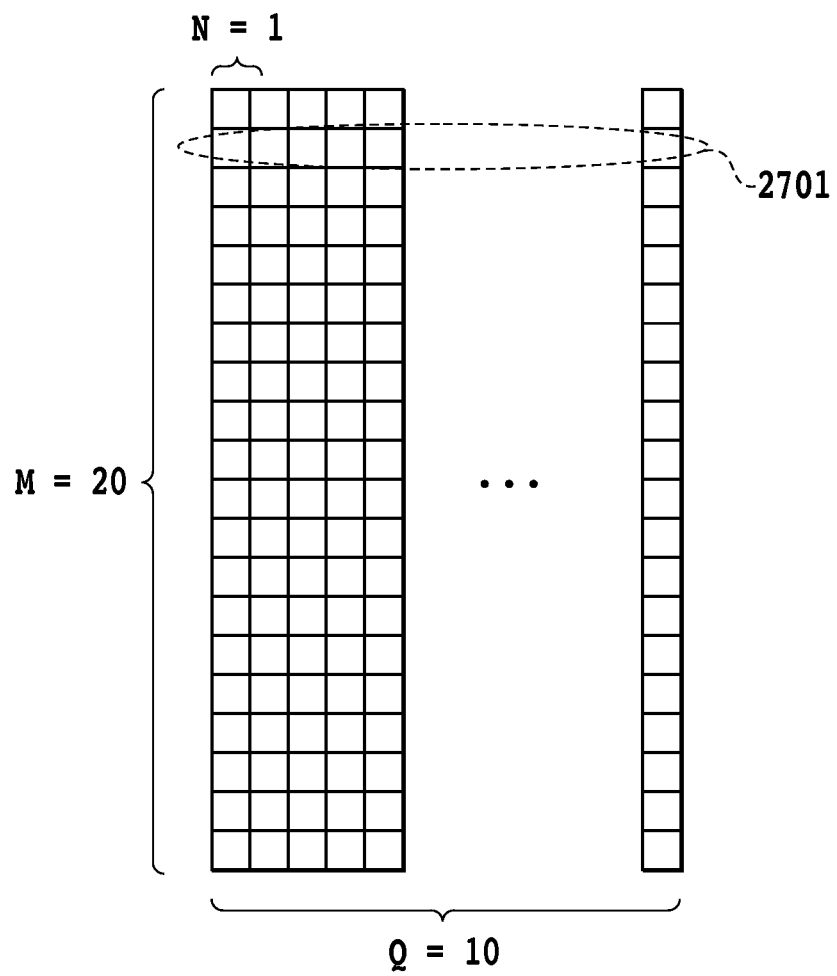
FIG. 27 is a schematic diagram illustrating subscanning profile calculation in the embodiment 2 in accordance with the present invention.

Step S2502: To obtain the gray scale characteristics at the edge 2204 (FIG. 22), the CPU circuit unit 310 acquires the data (gray level) of 20 lines in the subscanning direction and 10 pixels in the main scanning direction as shown in FIG. 27, thereby obtaining the representative gray scale characteristics (profile). At this step, a line counter (internal counter) for measuring lines in the subscanning direction (subscanning lines, or the vertical lines in FIG. 27) which are preset by the amount of ten pixels, is reset at the start of the processing.

Step S2503: At this step, as for subscanning lines of interest, the average value in the main scanning direction is obtained in a window of M×N pixels. In the example as shown in FIG. 27, since it is assumed that N=1 pixel and M (the width in the subscanning direction)=20 pixels, only one pixel is present in the main scanning direction. Thus, the result is the same eventually regardless of obtaining the average value or not.

Step S2504: To advance the position to the next subscanning line, the CPU circuit unit 310 increments the line counter and transfers the pixel position of interest to the next position in the main scanning direction.

Step S2505: The CPU circuit unit 310 makes a decision as to whether the processing proceeds by Q lines in the main scanning direction as a result of the processing at the foregoing steps S2503 and S2504. Although Q is set at Q=10 pixels in the example, Q is not limited to the value. If the decision is "YES", the processing proceeds to step S2506, and if the decision is "NO", it proceeds to step S2503.

Step S2506: If the CPU circuit unit 310 collects the edge characteristics (gray levels) by the amount of Q pixels, it obtains the representative value which is the average of the average values obtained at step S2503 in the main scanning direction at the position of interest in the subscanning direction (subscanning position), which is enclosed as denoted by the reference numeral 2701 of FIG. 27. In the example of FIG. 27, since the average value at each subscanning position is calculated, the one side (upper side) subscanning profile corresponding to the M (=20) pixels in the block of interest is created.

At step S2507, the CPU circuit unit 310 increments the internal counter for managing the number of blocks to shift the processing to the next block in the subscanning direction.

Step S2508: At this step, according to the number of blocks incremented at step S2507, if the CPU circuit unit 310 has processed the prescribed number of blocks (=P) (six blocks per color in the present embodiment), it completes the processing, and unless it has processed P blocks, it continues the processing from step S2502, again.

The foregoing is the detailed description of the edge characteristics acquiring processing in the subscanning direction at step S2302.

Subsequently, after the processing of the foregoing step S2302, the CPU circuit unit 310 performs step S2303.

Step S2303: At this step, using the main scanning profiles and the subscanning profiles obtained at step S2301 and step S2302, the CPU circuit unit 310 calculates the sum of the differences between the main scanning profiles and the subscanning profiles of the individual blocks.

Figure 28:
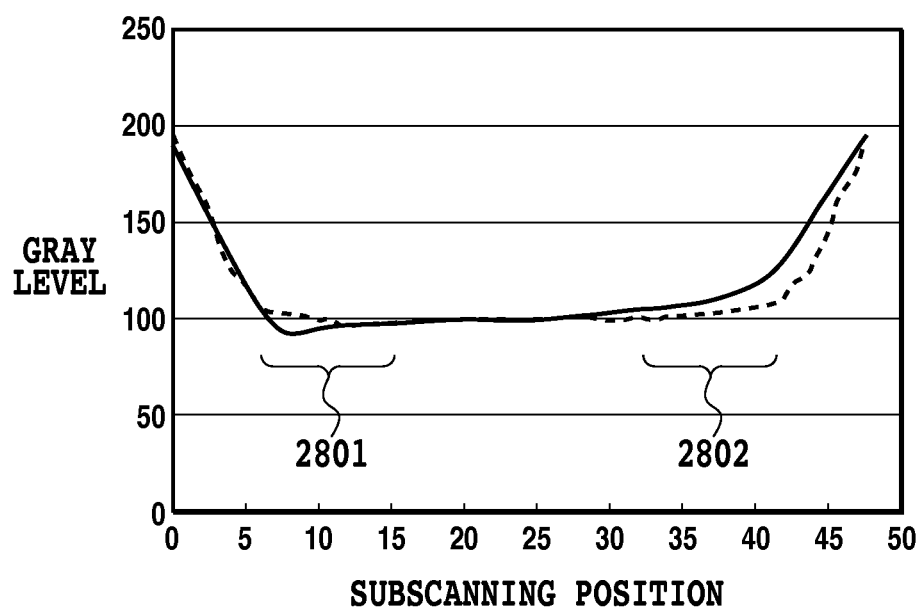
FIG. 28 shows an example of read results of a patch in the embodiment 2 in accordance with the present invention.

FIG. 28 shows an example of read results at a particular index of the block of interest. In FIG. 28, the vertical axis represents a read luminance signal (gray level), and the horizontal axis represents a subscanning position. In addition, a solid line indicates the gray scale characteristics at the edges in the subscanning direction, and a broken line indicates the gray scale characteristics at the edges in the main scanning direction. Furthermore, the reference numeral 2801 on the left side in FIG. 28 indicates that one edge in the subscanning direction has thick characteristics, and that another edge on the right side denoted by the reference numeral 2802 has thin characteristics.

At this step S2303, from the individual profiles obtained at step S2301 and at step S2302, the CPU circuit block 310 calculates the absolute values of the sums of the differences at the individual positions on the characteristics as shown in FIG. 28 for the 20 pixels on the left side and the 20 pixels on the right side for each index of the block of interest. The processing is equivalent to the visual inspection of the gray scale characteristics on the upper side and lower side of the patch in the embodiment 1. Incidentally, to put it concretely, the difference in the characteristics is the difference obtained by subtracting the gray levels denoted by the broken line from the gray levels denoted by the solid line at the individual subscanning positions as shown in FIG. 28.

Step S2304: At this step, the CPU circuit unit 310 compares the absolute values of the sums on the right side and left side of the individual indices calculated at step S2303 with a prescribed threshold to detect the region including the index smaller than the prescribed threshold, and stores it in the RAM 308 temporarily. In this case, if a plurality of values satisfying the threshold are present, the minimum absolute value of the sums is stored as the representative index. The fact that the absolute value of the sum is small means that the characteristics are close to the ideal. Accordingly, the index with the minimum value is adopted as the representative index. Furthermore, if a plurality of minimum absolute values of the sums are present, the index with the smaller value is selected as the exceptional processing.

The reason for searching for the region with the value equal to or less than the threshold is that it assumes that unless the characteristics such as the sweep up and solid black with white microdots are present, the edge characteristics would be the ideal as the edges in the main scanning direction, and that the sum of the differences in the characteristics obtained above becomes nearly zero.

The foregoing is the detailed description of the analytic processing at step S2106. After that, the processing returns to step S2107 forward.

Step S2107: At this step, according to the analytical results obtained at step S2106, the CPU circuit unit 310 checks whether there is appropriate portions to be corrected in the up and down indices in the individual blocks. It is decided according to whether the data stored in the RAM 308 for each index at step S2106 is present or not. If the values satisfying the threshold are present in all the gray scale regions, the processing proceeds to the next step S2108, and if not, the gray scale region is specified on the operating unit 313, and the correction gain selected at step S2102 is reselected, followed by repeating the subsequent steps.

Step S2108: If the portions to be corrected (representative indices) are found in the individual gray scale regions at the foregoing steps, the corresponding correction gains are stored in a prescribed register (table for edge gray scale correction) of the edge gray scale correction processing 414 as the representative correction gains of the individual gray scale regions.

Since the subsequent processing is the same as that of the embodiment 1, it is omitted here.

That brings the description of [Generation of Edge Correction Value] in the present embodiment to a close.

Incidentally, as a method of detecting a specific patch from the output sample of FIG. 6, there is the following method.

More specifically, it can be detected by calculating the relative block address information from the reading start point 601 of the cyan patch and the reading end point 602 of the magenta patch shown in FIG. 6, from the size of the patch used at the time of creating the electronic data of FIG. 6, and from the relative placement relationships of the blocks. It goes without saying that the address information on the individual blocks can be defined in advance. In addition, as for the method of obtaining the image positions of the individual blocks, they can be obtained by placing other patterns whose positions can be identified at the four corners of the sheet of FIG. 6, and by obtaining patterns using correlation calculation, but the method is not limited to these methods.

Other Embodiments

In the foregoing embodiments 1 and 2, a description is provided by way of example that carries out improvements by managing the up and down gray scale characteristics at the patch edges for each screen pattern and color to improve the gray scale characteristics at the image edges. However, as factors other than those, which have some effect on the characteristics, the effect of a medium type is strong. Thus, according to the characteristics of the media such as thick paper, plain paper and coated paper, the electrophotographic characteristics of the printer engine vary. That applies not only to the electrophotography, but also to sublimation printers and inkjet printers. It is important for high-definition imaging to manage the behavior of the gray level unevenness depending on the media.

Figure 29:
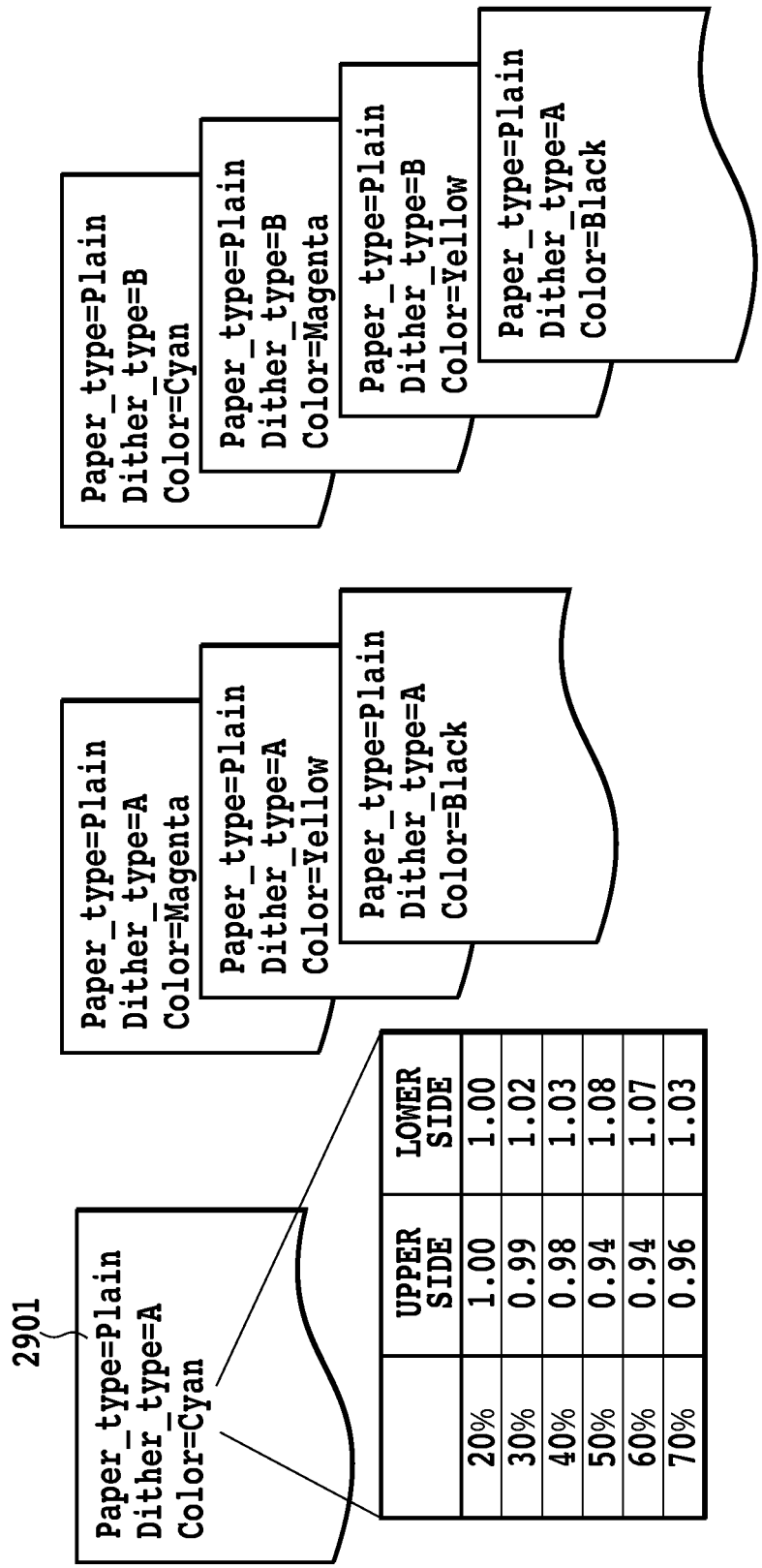
FIG. 29 shows a management example of the representative correction gain which will be explained in another embodiment in accordance with the present invention.

Accordingly, it is preferable to provide medium type designation to step S501 shown in FIG. 5 of the embodiment 1 or step S2101 of FIG. 21 of the embodiment 2 to manage the edge gray scale characteristics for each medium type. This enables the management as described in connection with FIG. 18 of the embodiment 1 to manage the representative correction gains for each medium with the tag (Paper type) as denoted by the reference numeral 2901 of FIG. 29, thereby being able to achieve the advantages of the present invention for each medium type.

In addition, the image processing apparatus in accordance with the present invention is applied not only to the image processing unit as shown in FIG. 3 and FIG. 4, but also to a dedicated image processing apparatus, general-purpose scanner, and a component connected to a general-purpose computer.

Furthermore, the object of the present invention is accomplished by causing a computer (or CPU or MPU) of a system or apparatus to read and execute program code from a storage medium that stores the program code for implementing the procedures of the flowcharts shown in the foregoing embodiments.

In this case, the program code itself read out of the storage medium causes the computer to carry out the functions of the foregoing embodiments. Accordingly, the program code and a computer readable storage medium that stores/records the program code constitute one aspect of the present invention.

As the storage medium for supplying the program code, a floppy disk (registered trademark), a hard disk, an optical disk, a magneto-optical disk, a CD-ROM, CD-R, magnetic tape, a nonvolatile memory card, ROM and the like can be used, for example.

Besides, the functions of the foregoing embodiments are implemented by causing the computer to execute the program code it reads out. The term "to execute the program" includes the case where an OS or the like working on the computer performs part or all of the actual processing according to the instructions of the program.

Furthermore, the functions of the foregoing embodiments can also be implemented by a function expansion board inserted into a computer or a function expansion unit connected to the computer. In this case, the program code read out of the storage medium is written into a memory in the function expansion board inserted into the computer or in the function expansion unit connected to the computer. After that, according to the instructions of the program, the CPU in the expansion board or in the expansion unit performs part or all of the actual processing. The functions of the foregoing embodiments can also be implemented by such a function expansion board or a function expansion unit connected.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-009541, filed Jan. 18, 2008, which is hereby incorporated by reference herein in its entirety.

What is claimed is:

1. An apparatus comprising:
a correcting component configured to correct grey levels of the upper and lower side edges in the subscanning direction of an image to be printed;
an output component configured to output a plurality of images to a printing component, wherein gray levels of a middle area in the subscanning direction in the plurality of images are common among the images, gray levels of one side edge in the subscanning direction in the plurality of images are different among the images and each gray level of the one side edge is thinner than those of the middle area, and gray levels of the other side edge in the subscanning direction in the plurality of the images are different among the images and each gray level of the other side edge is thicker than those of the middle area; and
an input component configured to input information from an operator of a) one of upper side edges among a plurality of upper side edges of the plurality of images and b) one of lower side edges among a plurality of lower side edges of the plurality of images, after the plurality of images are printed by the printing component,
wherein the correcting component corrects the grey levels of the upper and lower side edges in the subscanning direction of the image to be printed based on the input information.

2. The device according to claim 1, wherein the one side edge is the upper side edge, and the other side edge is the lower side edge.

3. A method comprising:
a correcting step of correcting grey levels of the upper and lower side edges in the subscanning direction of an image to be printed;
an outputting step of outputting a plurality of images to a printing component, wherein gray levels of a middle area in the subscanning direction in the plurality of images are common among the images, gray levels of one side edge in the subscanning direction in the plurality of images are different among the images and each gray level of the one side edge is thinner than those of the middle area, and gray levels of the other side edge in the subscanning direction in the plurality of the images are different among the images and each gray level of the other side edge is thicker than those of the middle area; and
an inputting step of inputting information from an operator of a) one of upper side edges among a plurality of upper side edges of the plurality of images and b) one of lower side edges among a plurality of lower side edges of the plurality of images, after the plurality of images are printed by the printing component,
wherein the correcting step corrects the grey levels of the upper and lower side edges in the subscanning direction of the image to be printed based on the input information.

4. An apparatus comprising:
a correcting component configured to correct gray levels of upper side and lower side edges in a subscanning direction of an image to be printed;
an output component configured to output a plurality of images to a printing component, wherein, gray levels of a middle area in the subscanning direction in the plurality of images are common among the images, gray levels of one side edge in the subscanning direction in the plurality of images are different among the images and each gray level of the one side edge is not thicker than those of the middle area, and gray levels of the other side edge in the subscanning direction in the plurality of the images are different among the images and each gray level of the other side edge is not thinner than those of the middle area; and
an input component configured to input information from an operator of a) one of upper side edges among a plurality of upper side edges of the plurality of the images and b) one of lower side edges among a plurality of lower side edges of the plurality of the images, after the plurality of the images are printed by the printing component,
wherein the correcting component corrects the grey levels of the upper and lower side edges in the subscanning direction of the image to be printed based on the input information.

5. The device according to claim 4, wherein the one side edge is the upper side edge, and the other side edge is the lower side edge.

6. A method comprising:

a correcting step of correcting gray levels of upper side and lower side edges in a subscanning direction of an image to be printed;

outputting a plurality of images to a printing component, wherein, gray levels of a middle area in the subscanning direction in the plurality of images are common among the images, gray levels of one side edge in the subscanning direction in the plurality of images are different among the images and each gray level of the one side edge is not thicker than those of the middle area, and gray levels of the other side edge in the subscanning direction in the plurality of the images are different among the images and each gray level of the other side edge is not thinner than those of the middle area; and inputting information from an operator of a) one of upper side edges among a plurality of upper side edges in the plurality of the images and b) one of lower side edges among a plurality of lower side edges in the plurality of the images, after the plurality of the images are printed by the printing component, wherein the correcting step corrects the grey levels of the upper and lower side edges in the subscanning direction of the image to be printed based on the input information.

\* \* \* \* \*